US011832242B2

(12) United States Patent
Huang et al.

(10) Patent No.: US 11,832,242 B2
(45) Date of Patent: Nov. 28, 2023

(54) SIDELINK CHANNEL STATE INFORMATION REPORTING

(71) Applicant: QUALCOMM Incorporated, San Diego, CA (US)

(72) Inventors: Yi Huang, San Diego, CA (US); Seyedkianoush Hosseini, San Diego, CA (US); Wei Yang, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/384,419

(22) Filed: Jul. 23, 2021

(65) Prior Publication Data

US 2022/0046660 A1 Feb. 10, 2022

Related U.S. Application Data

(60) Provisional application No. 63/061,003, filed on Aug. 4, 2020.

(51) Int. Cl.
*H04W 72/1263* (2023.01)
*H04W 72/0453* (2023.01)
(Continued)

(52) U.S. Cl.
CPC ......... *H04W 72/1263* (2013.01); *H04W 4/40* (2018.02); *H04W 24/10* (2013.01);
(Continued)

(58) Field of Classification Search
None
See application file for complete search history.

(56) References Cited

U.S. PATENT DOCUMENTS

| 2013/0077513 A1* | 3/2013 | Ng ......................... H04L 1/0026 370/254 |
| 2018/0146494 A1* | 5/2018 | Khoryaev ............. H04W 76/15 |

(Continued)

FOREIGN PATENT DOCUMENTS

CN 201911078607 * 7/2019

OTHER PUBLICATIONS

Author Unknown, Summary of [104#56][NR/V2X] AS Level Link Management for Unicast (Apple), pp. 1-27, Mar. 1, 2019.*

(Continued)

*Primary Examiner* — Christopher M Crutchfield
(74) *Attorney, Agent, or Firm* — Holland & Hart LLP

(57) ABSTRACT

Methods, systems, and devices for wireless communications are described. A user equipment (UE) may be configured to measure sidelink channel conditions for a group of UEs and transmit a report (e.g., a channel state information (CSI) report) to a base station indicating the sidelink channel conditions. The base station may transmit control information (e.g., group-common downlink control information (GC-DCI)) to the group of UEs triggering the UEs to transmit sidelink reference signals (e.g., CSI reference signals (CSI-RS)) on the sidelink channels so that the UE can measure the sidelink channel conditions and transmit the report. Based on the report, the base station may transmit control information (e.g., a downlink control information (DCI) message) scheduling sidelink communications for the group of UEs. In some examples, the UE may act as a relay node for the group of UEs, and forward control information to the group of UEs.

27 Claims, 17 Drawing Sheets

(51) Int. Cl.
| | |
|---|---|
| *H04W 72/23* | (2023.01) |
| *H04W 72/54* | (2023.01) |
| *H04W 76/14* | (2018.01) |
| *H04W 24/10* | (2009.01) |
| *H04W 4/40* | (2018.01) |
| *H04W 92/18* | (2009.01) |

(52) U.S. Cl.
CPC ....... *H04W 72/0453* (2013.01); *H04W 72/23* (2023.01); *H04W 72/54* (2023.01); *H04W 76/14* (2018.02); *H04W 92/18* (2013.01)

(56) References Cited

U.S. PATENT DOCUMENTS

| | | | |
|---|---|---|---|
| 2020/0232408 A1* | 7/2020 | Sase .................. | F02D 41/22 |
| 2021/0266945 A1* | 8/2021 | Ma .................. | H04W 76/14 |
| 2022/0053513 A1* | 2/2022 | Ryu .................. | H04W 72/1263 |
| 2022/0256386 A1* | 8/2022 | Kimba Dit Adamou .................... H04L 5/00 | |

OTHER PUBLICATIONS

Author Unknown, Consideration on sidelink RRM measurement, pp. 1-3, May 17, 2019.*

Intel Corporation: "Uu-Based Sidelink Resource Allocation for V2X Use Cases", 3GPP Draft, 3GPP TSG RAN WG1 Meeting #96, R1-1902486 Intel-EV2X_SL_CTRL, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 25, 2019-Mar. 1, 2019, Feb. 16, 2019 (Feb. 16, 2019), XP051600182, 10 pages, Retrieved from the Internet: URL: http://www.3gpp.org/ftp/tsg%5Fran/WG1%5FRL1/TSGR1%5F96/Docs/R1%2D1902486%2Ezip [retrieved on Feb. 16, 2019] Section 4.1.

International Search Report and Written Opinion—PCT/US2021/043122—ISA/EPO—dated Nov. 10, 2021.

NTT Docomo Inc., "NR Sidelink Resource Allocation Mechanism Mode 1," 3GPP Draft, 3GPP TSG RAN WG1 #96bis, R1-1905422 Mode 1_Final, 33rd Generation Partnership Project (3GPP), Mobile Competence Centre, 650, Route Des Lucioles, F-06921, Sophia-Antipolis Cedex, France, vol. RAB WG1, No. Xi'an, China, Apr. 8, 2019-Apr. 12, 2019, Apr. 3, 2019 (Apr. 3, 2019), XP051707492, 5 pages, Retrieved from the Internet: URL: http://www.3gpp.org/ftp/tsg%5Fran/WG1%5FRL1/TSGR1%5F96b/Docs/R1%2D1905422%2Ezip [retrieved on Apr. 3, 2019] Section 2.4, figure 1.

Spreadtrum Communications: "Discussion on NR Sidelink Mode 1 Resource Allocation", 3GPP Draft, 3GPP TSG RAN WG1 #97, R1-1906363 Discussion on NR Sidelink Mode 1 Resource Allocation Final, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727813, 8 pages, Retrieved from the Internet: URL: http://www.3gpp.org/ftp/Meetings%5F3GPP%5FSYNC/RAN1/Docs/R1%2D1906363%2Ezip [retrieved on May 13, 2019] Section 2.1, par. above "Proposal 6" incl. "Proposal 6 [ .. ]",Section 2.2, par. 1.

* cited by examiner

SIDELINK CHANNEL STATE INFORMATION REPORTING

CROSS REFERENCE

The present Application for Patent claims the benefit of U.S. Provisional Patent Application No. 63/061,003 by HUANG et al., entitled "SIDELINK CHANNEL STATE INFORMATION REPORTING," filed Aug. 4, 2020, assigned to the assignee hereof, and expressly incorporated by reference herein.

FIELD OF TECHNOLOGY

The following relates to wireless communications, including sidelink channel state information reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink channel state information reporting. Generally, the described techniques provide for configuring a user equipment (UE) to measure sidelink channel conditions relating to one or more UEs, such as a group of UEs, and to transmit a report (e.g., a channel state information (CSI) report) to a base station indicating the sidelink channel conditions. The base station may transmit control information (e.g., group-common downlink control information (GC-DCI)) to the group of UEs. The control information may trigger the UEs to transmit sidelink reference signals (e.g., CSI reference signals (CSI-RS)) on the one or more sidelink channels so that the UE can measure the sidelink channel conditions and transmit the report. Based on the report, the base station may transmit control information (e.g., a downlink control information (DCI) message, such as a DCI format 3-0 message) that may schedule sidelink communications for the group of UEs. In some examples, the UE may be a relay node for the group of UEs, and functioning as the relay node, may forward the control information (e.g., the GC-DCI) to the group of UEs. In some examples, the UE may modify (e.g., merge, aggregate, etc.) reports for a set of one or more sidelink channels.

A method of wireless communications at a first UE is described. The method may include receiving, from a base station, first control information associated with sidelink communications between the first UE and one or more second UEs. The method may also include receiving one or more respective sidelink reference signals from each second UE of the one or more second UEs on one or more sidelink channels based on the first control information. The method may include transmitting, to the base station, a report associated with the one or more sidelink channels based on performing one or more respective channel measurements for each sidelink channel of the one or more sidelink channels.

An apparatus for wireless communications at a first UE is described. The apparatus may include a processor, memory coupled with the processor, and instructions stored in the memory. The instructions may be executable by the processor to cause the apparatus to receive, from a base station, first control information associated with sidelink communications between the first UE and one or more second UEs and receive one or more respective sidelink reference signals from each second UE of the one or more second UEs on one or more sidelink channels based on the first control information. The instructions may be also executable by the processor to cause the apparatus to transmit, to the base station, a report associated with the one or more sidelink channels based on performing one or more respective channel measurements for each sidelink channel of the one or more sidelink channels.

Another apparatus for wireless communications at a first UE is described. The apparatus may include means for receiving, from a base station, first control information associated with sidelink communications between the first UE and one or more second UEs and means for receiving one or more respective sidelink reference signals from each second UE of the one or more second UEs on one or more sidelink channels based on the first control information. The apparatus may also include means for transmitting, to the base station, a report associated with the one or more sidelink channels based on performing one or more respective channel measurements for each sidelink channel of the one or more sidelink channels.

A non-transitory computer-readable medium storing code for wireless communications at a first UE is described. The code may include instructions executable by a processor to receive, from a base station, first control information associated with sidelink communications between the first UE and one or more second UEs and receive one or more respective sidelink reference signals from each second UE of the one or more second UEs on one or more sidelink channels based on the first control information. The code may include instructions executable by the processor to transmit, to the base station, a report associated with the one or more sidelink channels based on performing one or more respective channel measurements for each sidelink channel of the one or more sidelink channels.

Some examples of the method, apparatuses, and non-transitory computer-readable medium described herein may further include operations, features, means, or instructions for transmitting the first control information to the one or more second UEs, where the one or more sidelink reference signals may be received based on transmitting the first control information.

In some examples of the method, apparatuses, and non-transitory computer-readable medium described herein, transmitting the first control information may include operations, features, means, or instructions for transmitting the first control information to the one or more second UEs in a sidelink control information message, a data channel transmission, or both.

Some examples of the method, apparatuses, and non-transitory computer-readable medium described herein may further include operations, features, means, or instructions for performing the one or more respective channel measurements for each sidelink channel of the one or more sidelink channels based on receiving the one or more respective sidelink reference signals from each second UE of the one or more second UEs.

Some examples of the method, apparatuses, and non-transitory computer-readable medium described herein may further include operations, features, means, or instructions for identifying an uplink shared channel transmission resource allocation in the first control information, and transmitting the uplink shared channel transmission based on receiving the first control information, where the uplink shared channel transmission includes the report.

Some examples of the method, apparatuses, and non-transitory computer-readable medium described herein may further include operations, features, means, or instructions for determining an offset for the uplink shared channel transmission resource allocation, and applying the offset to the uplink shared channel transmission resource allocation, where the uplink shared channel transmission may be further transmitted based on applying the offset.

Some examples of the method, apparatuses, and non-transitory computer-readable medium described herein may further include operations, features, means, or instructions for receiving one or more respective sidelink reports from each second UE of the one or more second UEs, where transmitting the report to the base station may be further based on receiving the one or more sidelink reports.

In some examples of the method, apparatuses, and non-transitory computer-readable medium described herein, the one or more sidelink reference signals may be received in an active sidelink bandwidth or a bandwidth part of the active sidelink bandwidth.

In some examples of the method, apparatuses, and non-transitory computer-readable medium described herein, the report includes one or more respective sidelink channel reports corresponding to each sidelink channel of the one or more sidelink channels.

Some examples of the method, apparatuses, and non-transitory computer-readable medium described herein may further include operations, features, means, or instructions for receiving, from the base station, second control information associated with the sidelink communications based on the report and communicating the sidelink communications with the one or more second UEs based on the second control information.

In some examples of the method, apparatuses, and non-transitory computer-readable medium described herein, the second control information schedules the sidelink communications with the one or more second UEs, and the second control information includes a modulation and coding scheme, a power control command, one or more signal precoders for the sidelink communications based on the report, or any combination thereof.

In some examples of the method, apparatuses, and non-transitory computer-readable medium described herein, the first control information may be received in a group common downlink control information message. In some examples of the method, apparatuses, and non-transitory computer-readable medium described herein, the first control information may be received in a downlink control information message for the first UE.

In some examples of the method, apparatuses, and non-transitory computer-readable medium described herein, each sidelink reference signal of the one or more sidelink reference signals includes a sidelink CSI reference signal (CSI-RS), and the report includes a CSI report.

In some examples of the method, apparatuses, and non-transitory computer-readable medium described herein, the report includes a respective reference signal resource index corresponding to each sidelink reference signal of the one or more sidelink reference signals received on the one or more sidelink channels.

In some examples of the method, apparatuses, and non-transitory computer-readable medium described herein, the second control information may be received in a downlink control information message, a radio resource control message, or both.

A method of wireless communications at a base station is described. The method may include transmitting, to a first UE, first control information corresponding to sidelink communications between the first UE and one or more second UEs and receiving, from the first UE, a report associated with one or more sidelink channels for the sidelink communications based on transmitting the first control information.

An apparatus for wireless communications at a base station is described. The apparatus may include a processor, memory coupled with the processor, and instructions stored in the memory. The instructions may be executable by the processor to cause the apparatus to transmit, to a first UE, first control information corresponding to sidelink communications between the first UE and one or more second UEs, and receive, from the first UE, a report associated with one or more sidelink channels for the sidelink communications based on transmitting the first control information.

Another apparatus for wireless communications at a base station is described. The apparatus may include means for transmitting, to a first UE, first control information corresponding to sidelink communications between the first UE and one or more second UEs, and receiving, from the first UE, a report associated with one or more sidelink channels for the sidelink communications based on transmitting the first control information.

A non-transitory computer-readable medium storing code for wireless communications at a base station is described. The code may include instructions executable by a processor to transmit, to a first UE, first control information corresponding to sidelink communications between the first UE and one or more second UEs, and receive, from the first UE, a report associated with one or more sidelink channels for the sidelink communications based on transmitting the first control information.

Some examples of the method, apparatuses, and non-transitory computer-readable medium described herein may further include operations, features, means, or instructions for transmitting the first control information to the one or more second UEs, where receiving the report may be further based on transmitting the first control information to the one or more second UEs.

Some examples of the method, apparatuses, and non-transitory computer-readable medium described herein may further include operations, features, means, or instructions for determining an uplink shared channel transmission resource allocation for the first UE, where the first control information includes the uplink shared channel transmission resource allocation, and receiving the uplink shared channel transmission based on transmitting the first control information, where the uplink shared channel transmission includes the report.

In some examples of the method, apparatuses, and non-transitory computer-readable medium described herein, the report includes one or more respective sidelink channel reports corresponding to each sidelink channel of the one or more sidelink channels.

In some examples of the method, apparatuses, and non-transitory computer-readable medium described herein, the second control information schedules the sidelink communications with the one or more second UEs, and the second control information includes a modulation and coding scheme, a power control command, one or more signal precoders for the sidelink communications based on the report, or any combination thereof.

In some examples of the method, apparatuses, and non-transitory computer-readable medium described herein, the first control information may be transmitted in a group common downlink control information message.

In some examples of the method, apparatuses, and non-transitory computer-readable medium described herein, the report includes a CSI report.

In some examples of the method, apparatuses, and non-transitory computer-readable medium described herein, the report includes a respective reference signal resource index corresponding to each sidelink reference signal of one or more sidelink reference signals corresponding to the one or more sidelink channels.

Some examples of the method, apparatuses, and non-transitory computer-readable medium described herein may further include operations, features, means, or instructions for determining second control information corresponding to the sidelink communications based on receiving the report and transmitting the second control information to the first UE based on the determining.

In some examples of the method, apparatuses, and non-transitory computer-readable medium described herein, the second control information may be transmitted in a downlink control information message, a radio resource control message, or both.

DETAILED DESCRIPTION

Figure 1:
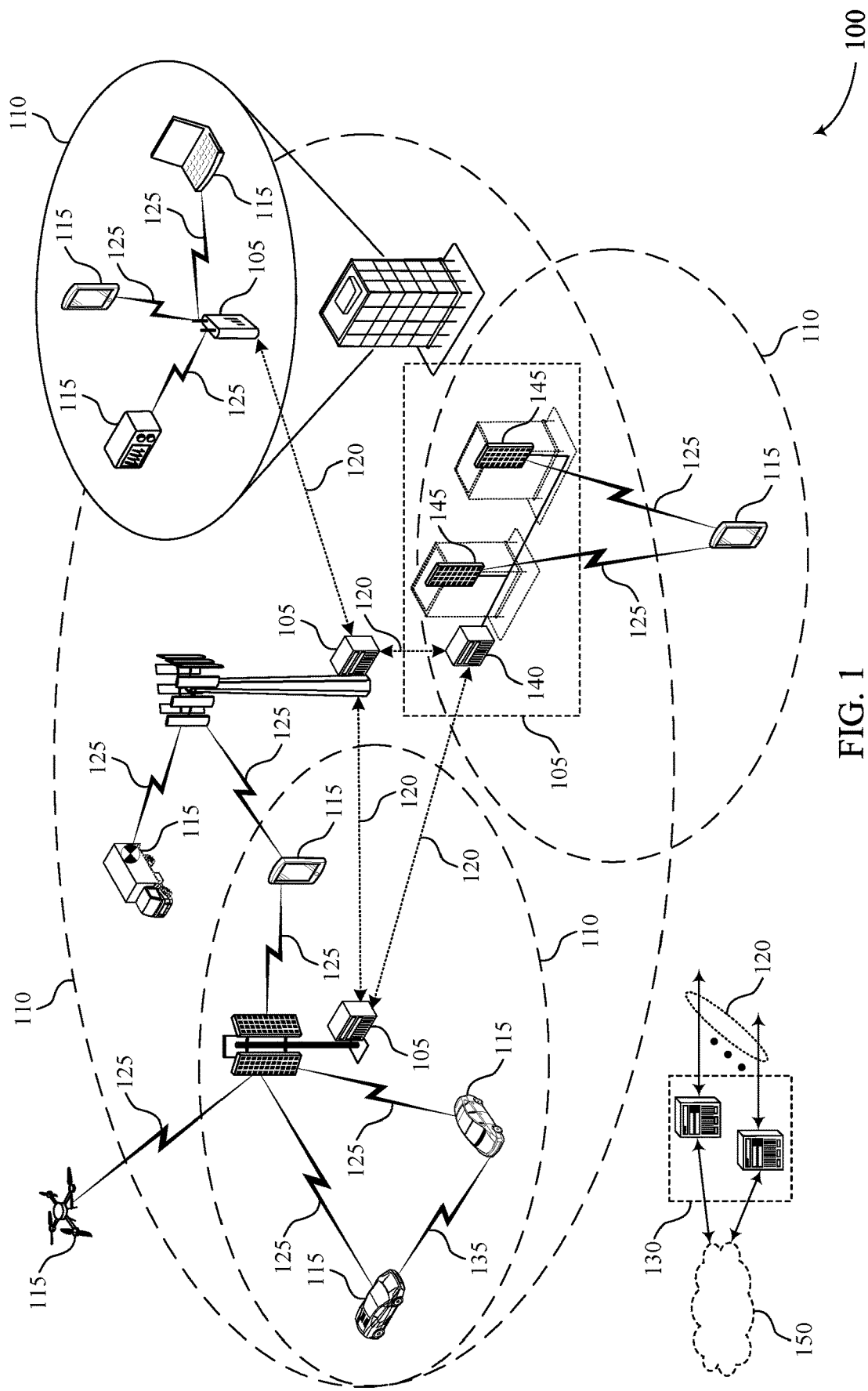
FIGS. 1 through 4 illustrate examples of wireless communications systems that support sidelink channel state information reporting in accordance with aspects of the present disclosure.

Some wireless communication systems may include one or more user equipments (UEs) and one or more base stations, such as next-generation NodeBs or giga-NodeBs (either of which may be referred to as a gNB) that may support one or more multiple radio access technologies including 4G systems such as Long Term Evolution (LTE) systems, fifth generation (5G) systems which may be referred to as New Radio (NR) systems, and Wi-Fi systems (e.g., wireless local area network (WLAN) systems). According to one or more of these example radio access technologies (RATs), one or more UEs may communicate directly with one another in sidelink communication channels via a sidelink connection (which may be referred to as a PC5 interface) without transmitting through a base station or through a non-UE relay point. A sidelink communication may be an example of device-to-device (D2D) communication, vehicle-to-everything (V2X) communication, or another example of sidelink communication in a wireless communications system. A UE may additionally communicate with a base station via an access link connection, which may be referred to as a Uu interface, in some examples.

In some cases, a base station may transmit a grant to a first UE (e.g., via a Uu interface) that schedules a sidelink communication between the first UE and a second UE (e.g., via a PC5 interface). Before performing the sidelink communication, the first UE or the second UE (or both) may be configured to perform channel measurements to determine sidelink channel conditions for the sidelink communication. It may be beneficial for the first UE or the second UE (or both) to report the results of the channel measurements to the base station to improve sidelink communication scheduling, among other benefits.

According to the techniques described herein, a UE may be configured to measure sidelink channel conditions for a group of UEs and transmit a report (e.g., a CSI report) to a base station indicating the sidelink channel conditions. The base station may transmit control information (e.g., group-common downlink control information (GC-DCI)) to the group of UEs. The control information may trigger the UEs to transmit sidelink reference signals (e.g., CSI reference signals (CSI-RS)) on the sidelink channels so that the UE can measure the sidelink channel conditions and transmit the report. Based on the report, the base station may transmit control information (e.g., a DCI message, such as a DCI format 3-0 message) scheduling sidelink communications for the group of UEs. In some examples, the UE, which may be one of the group of UEs in some examples, may be configured to act as a relay node for the group of UEs, and the relay node UE may forward the control information (e.g., the GC-DCI) to one or more other UEs, such as one or more UEs in the group of UEs. In some examples, the UE may modify, such as merge or aggregate, reports for a set of sidelink channels. Unless otherwise noted herein, a set as used herein may include one or more respective elements.

Aspects of the disclosure are initially described in the context of wireless communications systems. Aspects of the disclosure are further illustrated by and described with reference to a process flow, apparatus diagrams, system diagrams, and flowcharts that relate to sidelink channel state information reporting.

FIG. 1 illustrates an example of a wireless communications system 100 that supports sidelink channel state information reporting in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may be configured to measure sidelink channel conditions for a group of UEs 115 and transmit a report (e.g., a CSI report) to a base station 105 indicating the sidelink channel conditions. The base station 105 may transmit control information (e.g., GC-DC)) to the group of UEs 115. The control information may trigger the UEs to transmit sidelink reference signals (e.g., sidelink CSI-RS) on the sidelink channels so that the UE can measure the sidelink channel conditions and transmit the report. Based on the report, the base station may transmit control information (e.g., a DCI message, such as a DCI format 3-0 message) scheduling sidelink communications for the group of UEs. In some examples, the UE may be a relay node for the group of UEs, and the relay node may forward the control information (e.g., the GC-DCI) to the group of UEs. In some examples, the UE may merge or aggregate reports for a set of sidelink channels.

Figure 2:
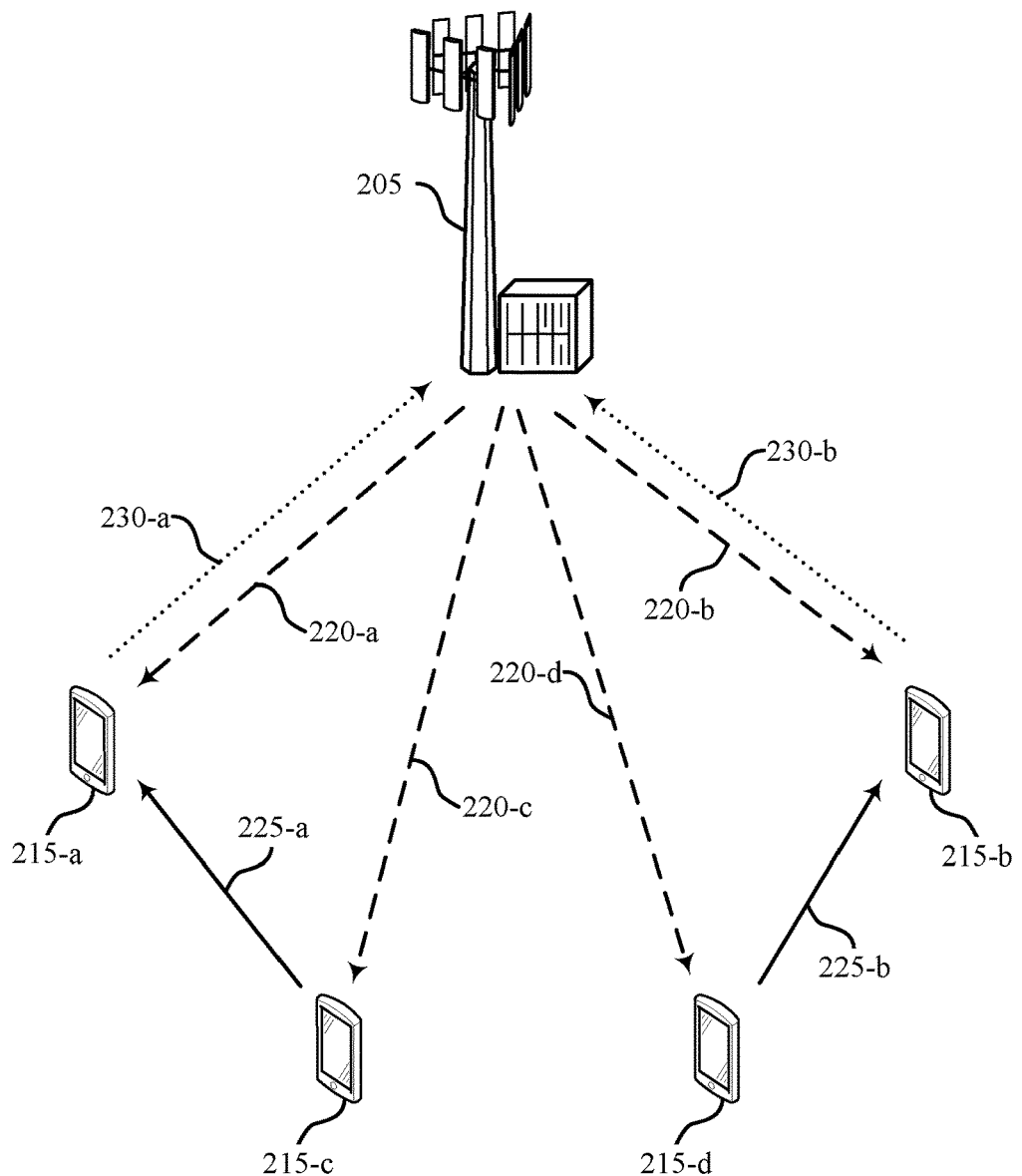

FIG. 2 illustrates an example of a wireless communications system 200 that supports sidelink channel state information reporting in accordance with aspects of the present disclosure. In some examples, the wireless communications system 200 may implement aspects of the wireless communications system 100. The wireless communications system 200 may include a base station 205 and UEs 215, which may be examples of the corresponding devices described with reference to FIG. 1. The wireless communications system 200 may include features for improved sidelink communication operations, among other benefits.

The UEs 215 may transmit and receive communications, for example, as scheduled by the base station 205. For example, the base station 205 may transmit dynamic grants or configured grants (e.g., type 1 configured grants, type 2 configured grants, among other examples) to the UEs 215 scheduling sidelink communications. The base station 205 may transmit the grants in control information 220 (e.g., via a Uu interface), where the control information 220 may include GC-DCI, a DCI message, an RRC message, other information, or any combination thereof.

Based on the control information 220, the UEs 215 may be configured to perform channel measurements on sidelink channels (e.g., via a PC5 interface) before communicating on the sidelink channels scheduled by the base station 205. For example, a UE 215-*c* may transmit a trigger (e.g., an aperiodic sidelink CSI trigger) to a UE 215-*a* based on receiving control information 220-*c* scheduling sidelink communications. In some examples, the UE 215-*c* may transmit the trigger in a sidelink control information (SCI) message, such as in a bit in a second stage SCI (SCI-2) message. In addition to the trigger, the UE 215-*c* may transmit a sidelink reference signal 225-*a* (e.g., a sidelink CSI-RS) to the UE 215-*a*. In some examples, the UE 215-*c* may transmit the sidelink reference signal in a narrow band (e.g., a BWP) of an active sidelink bandwidth associated with the sidelink channel. In some examples, the UE 215-*c* may transmit the sidelink reference signal 225-*a* in a data channel transmission, such as a physical sidelink shared channel (PSSCH) transmission. The UE 215-*c* may transmit the sidelink reference signal 225-*a* in resources not reserved for other transmissions (e.g., a physical sidelink control channel transmission, a PSSCH demodulation reference signal (DMRS), additional control information, a phase tracking reference signal (PTRS)).

Based on receiving the sidelink reference signal 225-*a*, the UE 215-*a* may perform channel measurements (e.g., one or more channel measurements) to determine channel conditions for the sidelink channel. The UE 215-*a* may report results of the channel measurements in a CSI report to the UE 215-*c*, which may be included in a MAC control element (MAC-CE) of a PSSCH transmission. In some examples, the CSI report may include a rank indicator (RI) or a channel quality indicator (CQI) or both. Based on the CSI report, the UE 215-*c* may communicate the sidelink communications as scheduled by the base station 205 in the control information 220-*c*. In some cases, the base station 205 may be unaware of the channel measurements and the sidelink CSI report performed based on the control information 220-*c*. As a result. the base station 205 may be unaware of changes in conditions on the sidelink channel. In some examples, the base station 205 may continue schedule additional sidelink communications on a sidelink channel which may have deteriorated due to environmental conditions. It may be beneficial for UEs 215 to report results of channel measurements to the base station 205 to improve sidelink communication scheduling, among other advantages.

According to the techniques described herein, the base station may transmit the control information 220 to the UEs 215 to trigger the UEs 215 to perform sidelink channel measurements based on sidelink reference signals 225, among other aspects, and report the results of the sidelink channel measurements to the base station 205 in reports 230. In some examples, the control information 220 may include a GC-DCI transmitted in a downlink transmission via a Uu interface, and the control information 220 may indicate resources on an uplink transmission via the Uu interface for transmitting the reports 230. The control information 220 may identify pairs of UEs 215 for performing the sidelink channel measurements. For example, the control information 220 may indicate that the UE 215-*c* is to transmit the sidelink reference signal 225-*a* to be measured by the UE 215-*a*, and that a UE 215-*d* is to transmit a sidelink reference signal 225-*b* to be measured by a UE 215-*b*. In some examples, the sidelink reference signals 225 may be transmitted as a wideband sidelink CSI-RS (e.g., across the full active sidelink bandwidth associated with the sidelink channel) that is not included in a PSSCH transmission, or as a narrowband sidelink CSI-RS in a PSSCH transmission.

Based on receiving the sidelink reference signals 225, the UEs 215-*a* and 215-*b* may transmit reports 230-*a* and 230-*b*, respectively, to the base station 205. The reports 230 may indicate channel conditions on the associated sidelink channels. In some examples, the report 230 may be a CSI report, which may include an RI, a precoding matrix indicator (PMI), a CSI-RS resource index (CRI), etc. The CRI may indicate the sidelink reference signal 225 on which the report 230 is based. In some examples, the UEs 215-*a* and 215-*b* may perform channel measurements to generate the reports 230. For example, the UE 215-*a* or the UE 215-*b* may measure a reference signal received power (RSRP), a reference signal received quality (RSRQ), another parameter, or any combination thereof, to determine the sidelink channel conditions and generate the reports 230. In some examples, the UE 215-*a* may transmit the report 230-*a* in resources of the uplink transmission (e.g., a physical uplink shared channel (PUSCH) transmission) indicated in the GC-DCI. In some examples, the GC-DCI may include a reference PUSCH resource allocation, and the UE 215-*a* may apply an offset (e.g., a predetermined or preconfigured offset) to the reference allocation to determine which resources to use for transmitting the report 230-*a*.

Based on the reports 230, the base station 205 may accurately schedule sidelink communications (e.g., based on the additional information provided in the reports 230 and/or other information not provided in other different systems) between the UEs 215. For example, the base station may transmit additional control information 220, such as a DCI message containing control information 220-*a*, scheduling a sidelink transmission from a first UE 215 (e.g., the UE 215-*a*) to a second UE 215 (e.g., the UE 215-*c*). In some examples, the DCI message may be a DCI format 3-0 message. The control information 220-*a* may include a signal precoder for a PSSCH transmission from the UE 215-*a* to the UE 215-*c*. The reports 230 based on the sidelink reference signals 225 may thus improve reliability for sidelink communications between the UEs 215, among other benefits.

Figure 3:
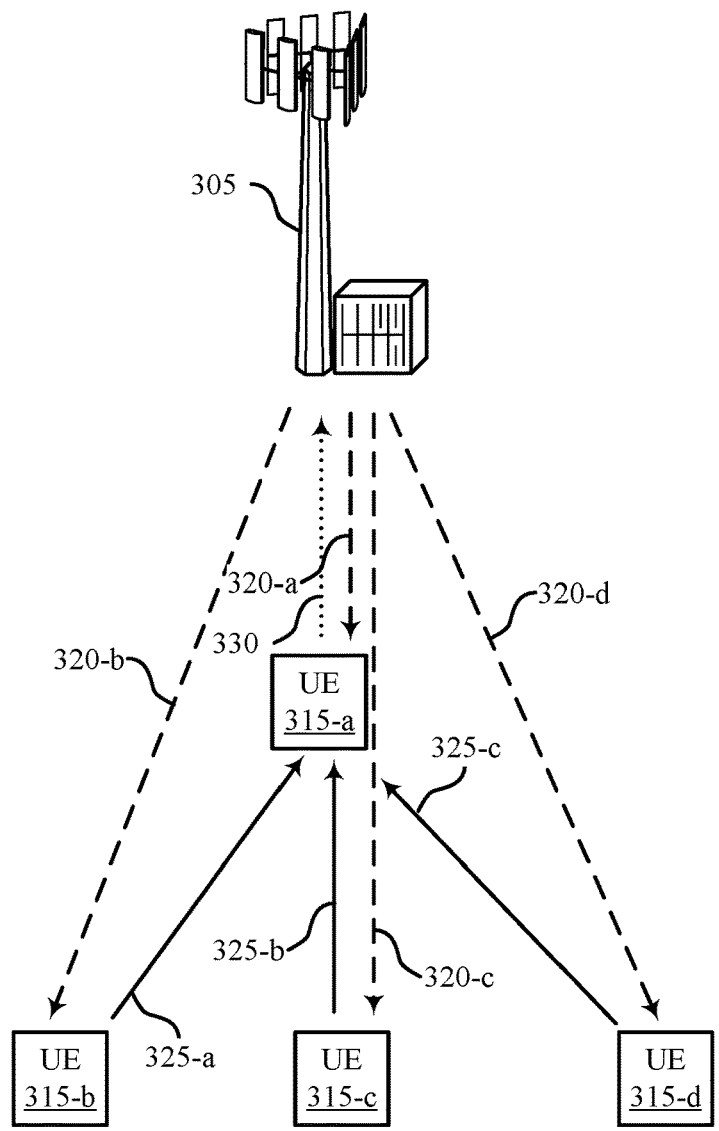
Figure 3:
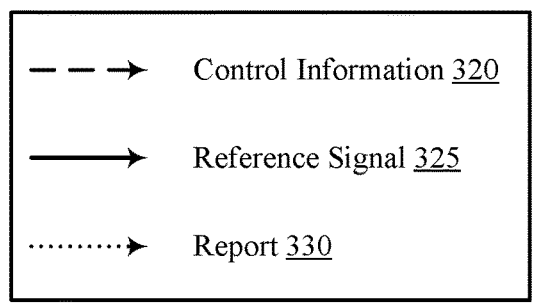

FIG. 3 illustrates an example of a wireless communications system 300 that supports sidelink channel state information reporting in accordance with aspects of the present disclosure. In some examples, the wireless communications system 300 may implement aspects of the wireless communications system 100. The wireless communications system 300 may include a base station 305 and UEs 315, which may be examples of the corresponding devices described with reference to FIG. 1. The wireless communications system 300 may include features for improved sidelink communication operations, among other benefits.

As illustrated in FIG. 3, a UE 315-*a* may act as a relay node for UEs 315-*b*, 315-*c*, and 315-*d*. For example, the UE 315-*a* may be a smartphone or other wireless device, and the UEs 315-*b*, 315-*c*, and 315-*d* may be other devices with reduced capability compared to the UE 315-*a*, such as wearable devices, industrial internet of things devices, or other devices with reduced capability. The UEs 315 may be within a coverage area of the base station 305. The base station 305 may broadcast control information 320 (e.g., a GC-DCI) to the UEs 315 to trigger the UEs 315-*b*, 315-*c*, and 315-*d* to transmit sidelink reference signals 325 to the UE 315-*a* (e.g., the relay node). Based on the sidelink reference signals 325, the UE 315-*a* may determine channel conditions for sidelink channels (e.g., via a PC5 interface) between the UE 315-*a* and the UEs 315-*b*, 315-*c*, and 315-*d*. For example, the UE may determine channel conditions for a sidelink channel between the UE 315-*a* and the UE 315-*b* based on receiving a sidelink reference signal 325-*a* from the UE 315-*b*. In some examples, the UE 315-*a* may perform channel measurements (e.g., measuring RSRP or RSRQ, among other examples) based on the received sidelink reference signals 325 to determine the sidelink channel conditions.

The UE 315-*a* may generate a report 330 (e.g., a CSI report) based on determining the sidelink channel conditions and transmit the report 330 to the base station 305. In some examples, the UE 315-*a* may receive sidelink reports from the UEs 315-*b*, 315-*c*, and 315-*d*. The sidelink reports may indicate information on the sidelink channel conditions. In such examples, the UE 315-*a* may modify, such as aggregate or merge, the sidelink reports to generate the report 330.

Based on the report 330, the base station 305 may accurately schedule sidelink communications (e.g., based on the additional information provided in the report 330 and/or other information not provided in other different systems) between the UEs 315. For example, the base station may transmit additional control information 320, such as a DCI message containing control information 320-*a*, scheduling a sidelink transmission from a first UE 315 (e.g., the UE 315-*a*) to a second UE 315 (e.g., the UE 315-*c*). In some examples, the DCI message may be a DCI format 3-0 message. The control information 320-*a* may include a signal precoder, a modulation and coding scheme (MCS), a power control command, or any combination thereof, corresponding to a PSSCH transmission from the UE 315-*a* to the UE 315-*c*. The report 330 based on the sidelink reference signals 325 may thus improve reliability for sidelink communications between the UEs 315, among other benefits.

Figure 4:
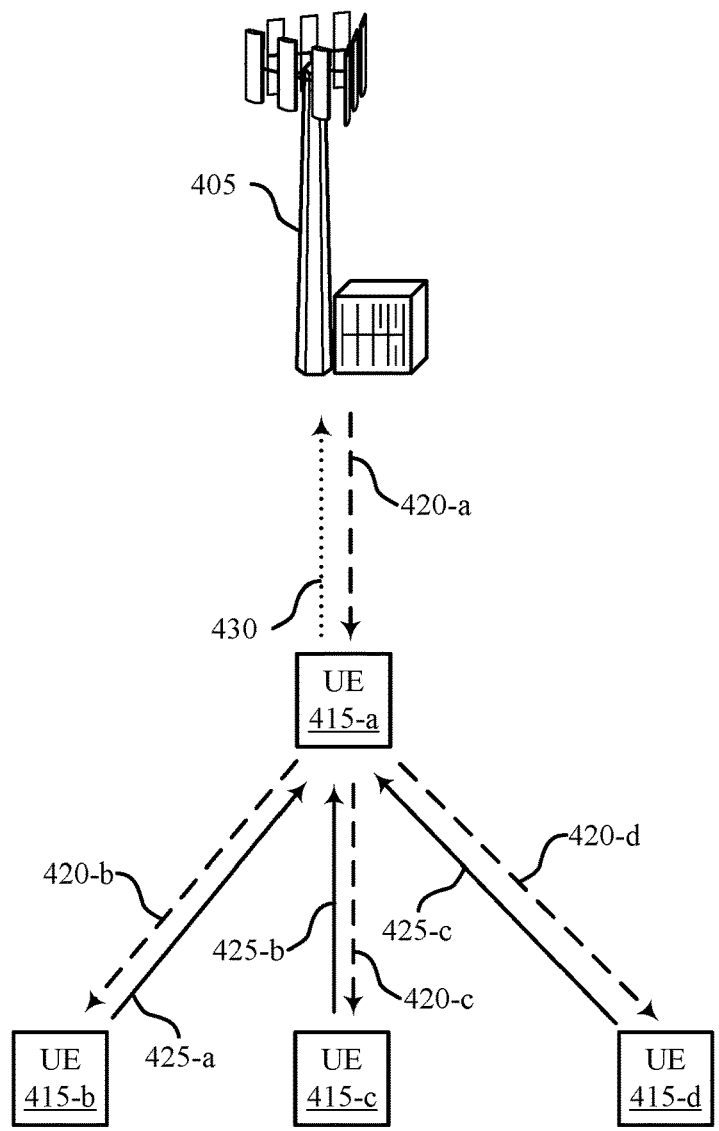

FIG. 4 illustrates an example of a wireless communications system 400 that supports sidelink channel state information reporting in accordance with aspects of the present disclosure. In some examples, the wireless communications system 400 may implement aspects of the wireless communications system 100. The wireless communications system 400 may include a base station 405 and UEs 415, which may be examples of the corresponding devices described with reference to FIG. 1. The wireless communications system 400 may include features for improved sidelink communication operations, among other benefits.

As illustrated in FIG. 4, a UE 415-*a* may act as a relay node for UEs 415-*b*, 415-*c*, and 415-*d*. The UEs 415-*b*, 415-*c*, and 415-*d* may be out of coverage of the base station 405. The base station 405 may transmit control information 420-*a* (e.g., a GC-DCI) to the UE 415-*a*, and the UE 415-*a* may forward the control information 420-*a* to the UEs 415-*b*, 415-*c*, and 415-*d* in control information 420-*b*, 420-*c*, and 420-*d*, respectively. In some examples, the UE 415-*a* may transmit the control information 420-*a* in an SCI-2 message, such as in a field of an SCI-2 message transmitted in the control information 420-*b*, 420-*c*, and 420-*d*. Additionally or alternatively, the UE 415-*a* may transmit the control information 420-*a* in a data channel.

The forwarded control information 420 may trigger the UEs 415-*b*, 415-*c*, and 415-*d* to transmit sidelink reference signals 425 to the UE 415-*a* (e.g., the relay node). Based on the sidelink reference signals 425, the UE 415-*a* may determine channel conditions for sidelink channels (e.g., via a PC5 interface) between the UE 415-*a* and the UEs 415-*b*, 415-*c*, and 415-*d*. For example, the UE may determine channel conditions for a sidelink channel between the UE 415-*a* and the UE 415-*b* based on receiving a sidelink reference signal 425-*a* from the UE 415-*b*. In some examples, the UE 415-*a* may perform channel measurements (e.g., measuring RSRP or RSRQ, among other examples) based on the received sidelink reference signals 425 to determine the sidelink channel conditions.

The UE 415-*a* may generate a report 430 (e.g., a CSI report) based on determining the sidelink channel conditions and transmit the report 430 to the base station 405. In some examples, the UE 415-*a* may receive sidelink reports from the UEs 415-*b*, 415-*c*, and 415-*d*. The sidelink reports may indicate information on the sidelink channel conditions. In such examples, the UE 415-*a* may aggregate or merge the sidelink reports to generate the report 430.

Based on the report 430, the base station 405 may accurately schedule sidelink communications (e.g., based on the additional information provided in the reports 430 and/or other information not provided in other different systems) between the UEs 415. For example, the base station may transmit additional control information 420, such as a DCI message containing control information 420-*a*, scheduling a sidelink transmission from a first UE 415 (e.g., the UE 415-*a*) to a second UE 415 (e.g., the UE 415-*c*). In some examples, the DCI message may be a DCI format 4-0 message. The control information 420-*a* may include a signal precoder, a modulation and coding scheme (MCS), a power control command, or any combination thereof, corresponding to the a PSSCH transmission from the UE 415-*a* to the UE 415-*c*. The report 430 based on the sidelink reference signals 425 may thus improve reliability for sidelink communications between the UEs 415, among other benefits.

Figure 5:
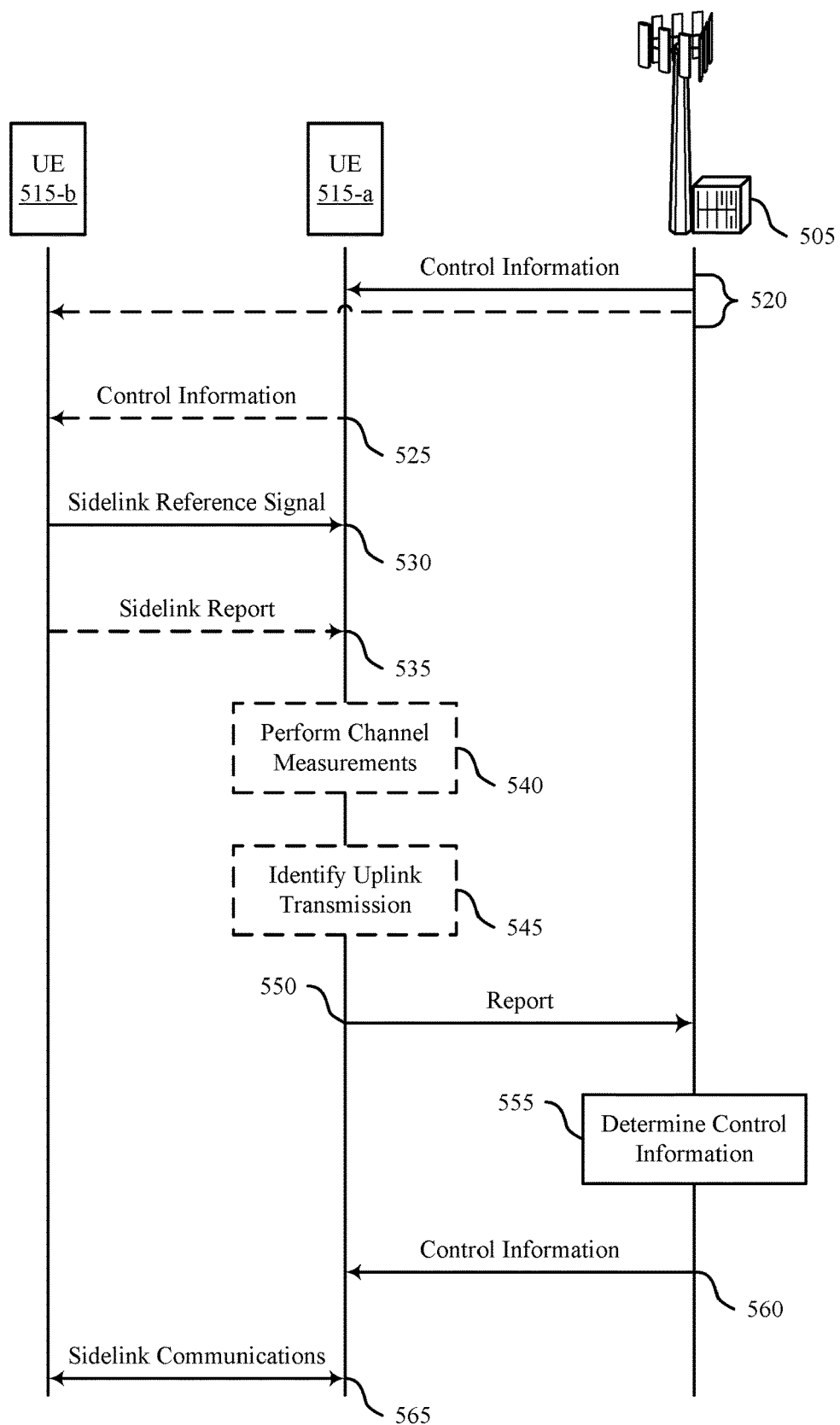
FIG. 5 illustrates an example of a process flow that supports sidelink channel state information reporting in accordance with aspects of the present disclosure.

FIG. 5 illustrates an example of a process flow 500 that supports sidelink channel state information reporting in accordance with aspects of the present disclosure. In some examples, the process flow 500 may be implemented by or may implement aspects of wireless communications systems 100, 200, 300, or 400. For example, the process flow 500 may include example operations associated with one or more of a base station 505 or a set of UEs 515, which may be examples of the corresponding devices described with reference to FIGS. 1 through 4. In the following description of the process flow 500, the operations between the base station 505 and the UEs 515 may be performed in a different order than the example order shown, or the operations performed by the base station 505 and the UEs 515 may be performed in different orders or at different times. Some operations may also be omitted from the process flow 500, and other operations may be added to the process flow 500. The operations performed by the base station 505 and the UEs 515 may promote improvements to efficiency and reliability for sidelink communications between the UEs 515, among other benefits.

At 520, the base station 505 may transmit control information (e.g., first control information, such as GC-DCI) to a UE 515-*a*. The control information may be associated with sidelink communications between the UE 515-*a* and a UE 515-*b*. In some examples, the base station 505 may transmit the control information to the UE 515-*b*. Additionally or alternatively, the UE 515-*a* may act as a relay node for the UE 515-*b*, and at 525 the UE 515-*a* may forward the control information to the UE 515-*b*, for example in an SCI message or a data channel transmission.

At 530, the UE 515-*a* may receive a sidelink reference signal from the UE 515-*b* based on the control information. The sidelink reference signal may be transmitted on a sidelink channel between the UE 515-*a* and the UE 515-*b*, for example via a PC5 interface. In some examples, the sidelink reference signal may be a sidelink CSI-RS.

In some examples, at 535 the UE 515-*a* may receive a sidelink report from the UE 515-*b* that indicates information on channel conditions for the sidelink channel. The sidelink report may include a CSI report. Additionally, or alternatively, at 540 the UE 515-*a* may perform channel measurements (e.g., measuring RSRP or RSRQ, among other examples) based on the received sidelink reference signal to determine the sidelink channel conditions.

In some examples, at 545 the UE 515-*a* may identify an uplink transmission for transmitting a report to the base station 505. In some examples, the UE 515-*a* may identify the uplink transmission based on an indication in the control information (e.g., the GC-DCI). In some examples, the control information may include a reference PUSCH resource allocation, and the UE 515-*a* may apply an offset (e.g., a predetermined or preconfigured offset) to the reference allocation to determine which resources to use for transmitting the report.

At 550, the UE 515-*a* may transmit the report to the base station 505. In some examples, the report may be a CSI report, which may include an RI, a PMI, a CRI, or any combination thereof. The CRI may indicate the sidelink reference signal on which the report is based. In some examples, the UE 515-*a* may aggregate or merge the sidelink report with additional sidelink reports to generate the report, where the report may include respective CRIs indicating each sidelink reference signal on which the report is based.

At 555, the base station 505 may determine control information (e.g., second control information, such as DCI) for the UEs 515 based on the report. For example, the base station 505 may use the report to accurately schedule sidelink communications between the UEs 515, and include a grant for the sidelink communications in the control information. In some examples, the control information may include a DCI format 3-0 message. In some examples, the control information may include a signal precoder, an MCS, a power control command, or any combination thereof, corresponding to a PSSCH communication between the UE 515-*a* and the UE 515-*b*.

At 560, the base station 505 may transmit the control information to the UE 515-*a*. At 565, the UE 515-*a* may communicate the sidelink communications with the UE 515-*b* based on the control information. The report based on the sidelink reference signal, as well as the other operations performed by the UEs 515 and the base station 505, may thus improve reliability for sidelink communications between the UEs 515, among other benefits.

Figure 6:
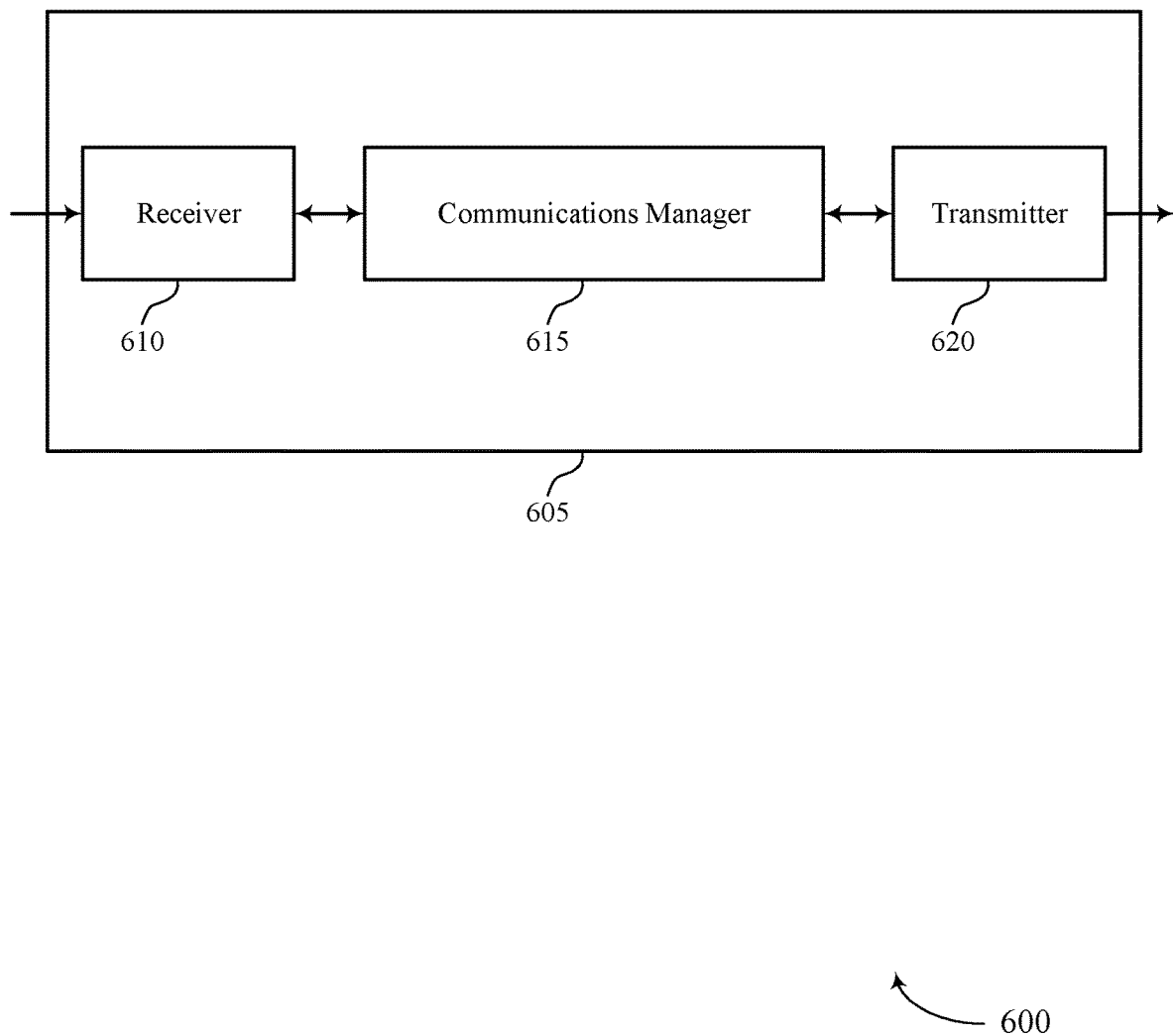
FIGS. 6 and 7 show block diagrams of devices that support sidelink channel state information reporting in accordance with aspects of the present disclosure.

FIG. 6 shows a block diagram 600 of a device 605 that supports sidelink channel state information reporting in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink channel state information reporting, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, first control information associated with sidelink communications between the first UE and one or more second UEs. In some examples, the communications manager 615 may receive one or more respective sidelink reference signals from each second UE of the one or more second UEs on one or more sidelink channels based on the first control information. The communications manager 615 may also transmit, to the base station, a report associated with the one or more sidelink channels based on performing one or more respective channel measurements for each sidelink channel of the one or more sidelink channels. The communications manager 615 may receive, from the base station, second control information associated with the sidelink communications based on the report. The communications manager 615 may also communicate the sidelink communications with the one or more second UEs based on the second control information.

The communications manager 615 as described herein may be implemented to realize one or more potential advantages. One implementation may allow the device 605 to save power by communicating with UEs 115 (as shown in FIG. 1) in sidelink communications more efficiently. For example, the device 605 may improve reliability in communications with UEs 115, as the device 605 may be able to report sidelink channel conditions to a base station to improve scheduling procedures. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
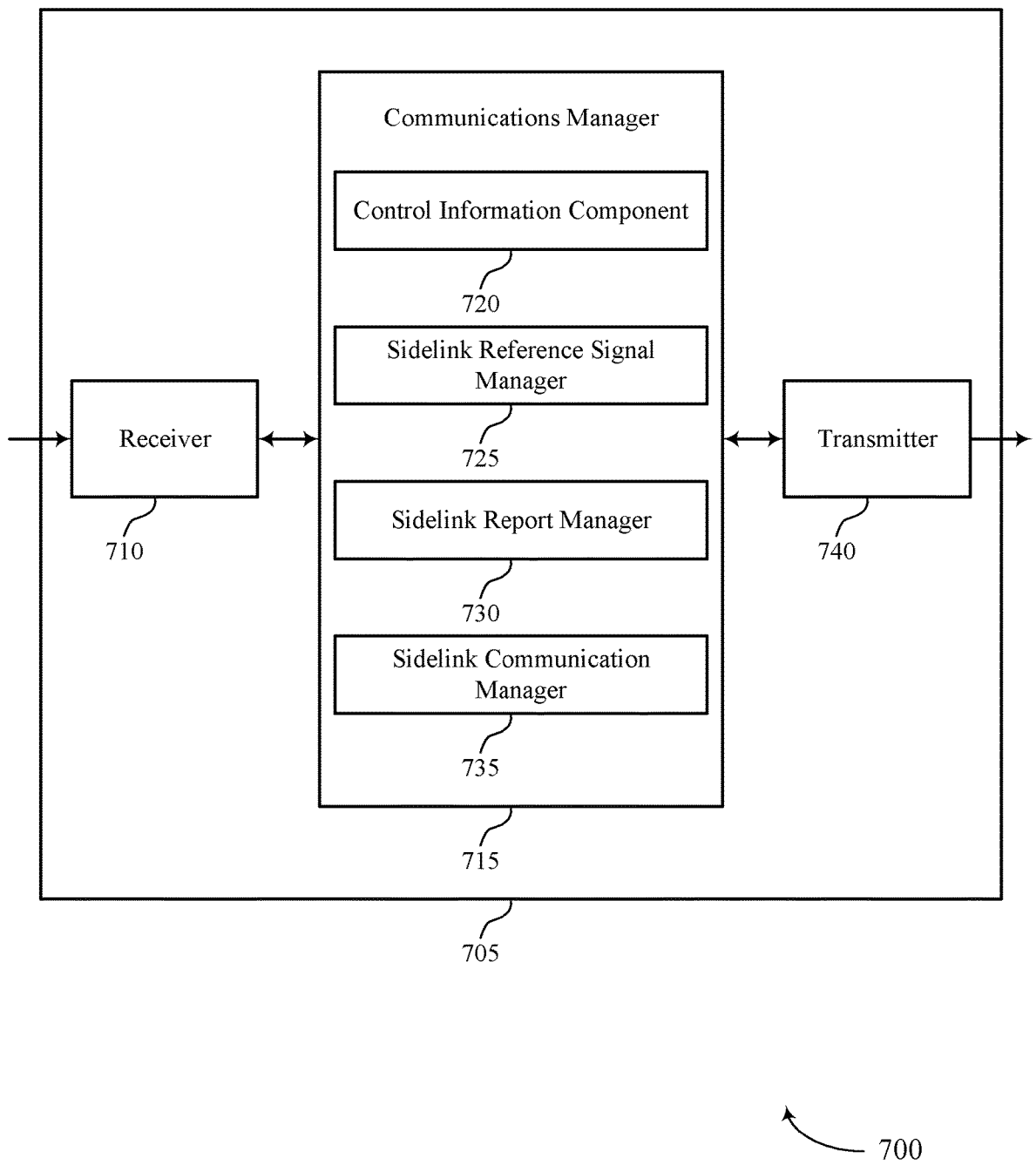

FIG. 7 shows a block diagram 700 of a device 705 that supports sidelink channel state information reporting in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to sidelink channel state information reporting, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a control information component 720, a sidelink reference signal manager 725, a sidelink report manager 730, and a sidelink communication manager 735. The communications manager 715 may be an example of aspects of the communications manager 910 described herein.

The control information component 720 may receive, from a base station, first control information associated with sidelink communications between the first UE and one or more second UEs. The sidelink reference signal manager 725 may receive one or more respective sidelink reference signals from each second UE of the one or more second UEs on one or more sidelink channels based on the first control information. The sidelink report manager 730 may transmit, to the base station, a report associated with the one or more sidelink channels based on performing one or more respective channel measurements for each sidelink channel of the one or more sidelink channels. The control information component 720 may receive, from the base station, second control information associated with the sidelink communications based on the report. The sidelink communication manager 735 may communicate the sidelink communications with the one or more second UEs based on the second control information.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
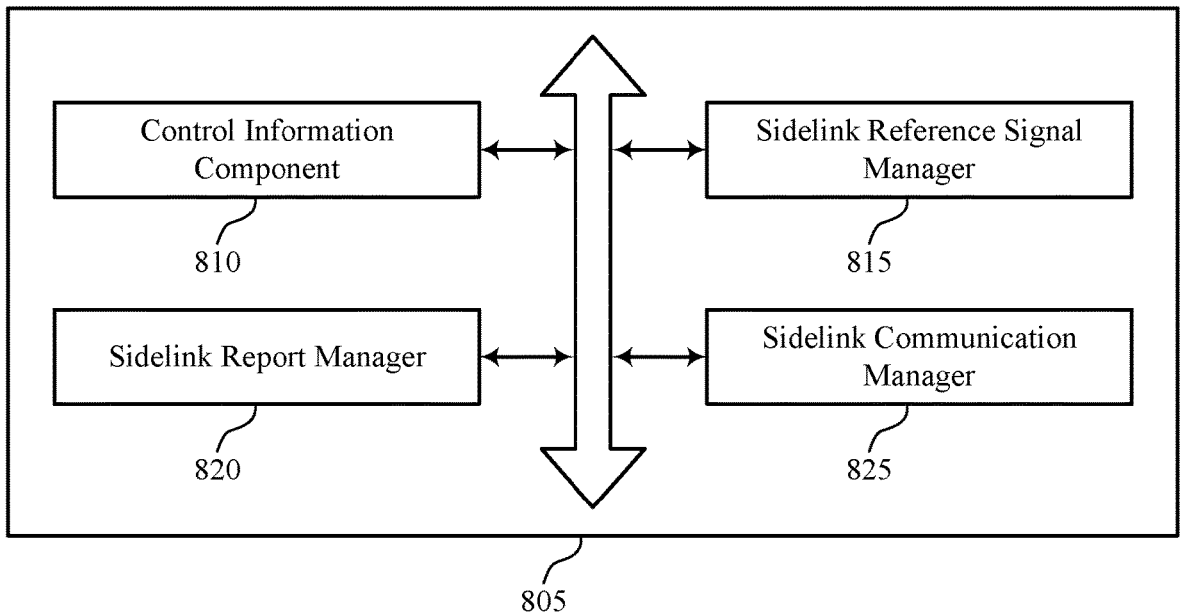
FIG. 8 shows a block diagram of a communications manager that supports sidelink channel state information reporting in accordance with aspects of the present disclosure.

FIG. 8 shows a block diagram 800 of a communications manager 805 that supports sidelink channel state information reporting in accordance with aspects of the present disclosure. The communications manager 805 may be an example of aspects of a communications manager 615, a communications manager 715, or a communications manager 910 described herein. The communications manager 805 may include a control information component 810, a sidelink reference signal manager 815, a sidelink report manager 820, and a sidelink communication manager 825. Each of these modules may communicate, directly or indirectly, with one another (e.g., via one or more buses).

The control information component 810 may receive, from a base station, first control information associated with sidelink communications between the first UE and one or more second UEs. In some examples, the control information component 810 may transmit the first control information to the one or more second UEs, where the one or more sidelink reference signals are received based on transmitting the first control information. In some examples, the control information component 810 may transmit the first control information to the one or more second UEs in a sidelink control information message, a data channel transmission, or both. In some examples, the control information component 810 may identify an uplink shared channel transmission resource allocation in the first control information. In some cases, the first control information is received in a group common downlink control information message.

In some examples, the control information component 810 may receive, from the base station, second control information associated with the sidelink communications based on the report. In some cases, the second control information schedules the sidelink communications with the one or more second UEs. In some cases, the second control information includes a modulation and coding scheme, a power control command, one or more signal precoders for the sidelink communications based on the report, or any combination thereof. In some cases, the second control information is received in a downlink control information message, a radio resource control message, or both.

The sidelink reference signal manager 815 may receive one or more respective sidelink reference signals from each second UE of the one or more second UEs on one or more sidelink channels based on the first control information. In some examples, the sidelink reference signal manager 815 may perform the one or more respective channel measurements for each sidelink channel of the one or more sidelink channels based on receiving the one or more respective sidelink reference signals from each second UE of the one or more second UEs. In some cases, the one or more sidelink reference signals are received in an active sidelink bandwidth or a bandwidth part of the active sidelink bandwidth. In some cases, each sidelink reference signal of the one or more sidelink reference signals includes a sidelink CSI-RS.

The sidelink report manager 820 may transmit, to the base station, a report associated with the one or more sidelink channels based on performing one or more respective channel measurements for each sidelink channel of the one or more sidelink channels. In some examples, transmitting the uplink shared channel transmission based on receiving the first control information, where the uplink shared channel transmission includes the report. In some examples, the sidelink report manager 820 may determine an offset for the uplink shared channel transmission resource allocation. In some examples, the sidelink report manager 820 may apply the offset to the uplink shared channel transmission resource allocation, where the uplink shared channel transmission is further transmitted based on applying the offset. In some examples, the sidelink report manager 820 may receive one or more respective sidelink reports from each second UE of the one or more second UEs, where transmitting the report to the base station is further based on receiving the one or more sidelink reports. In some cases, the report includes one or more respective sidelink channel reports corresponding to each sidelink channel of the one or more sidelink channels. In some cases, the report includes a CSI report. In some cases, the report includes a respective reference signal resource index corresponding to each sidelink reference signal of the one or more sidelink reference signals received on the one or more sidelink channels.

The sidelink communication manager 825 may communicate the sidelink communications with the one or more second UEs based on the second control information.

Figure 9:
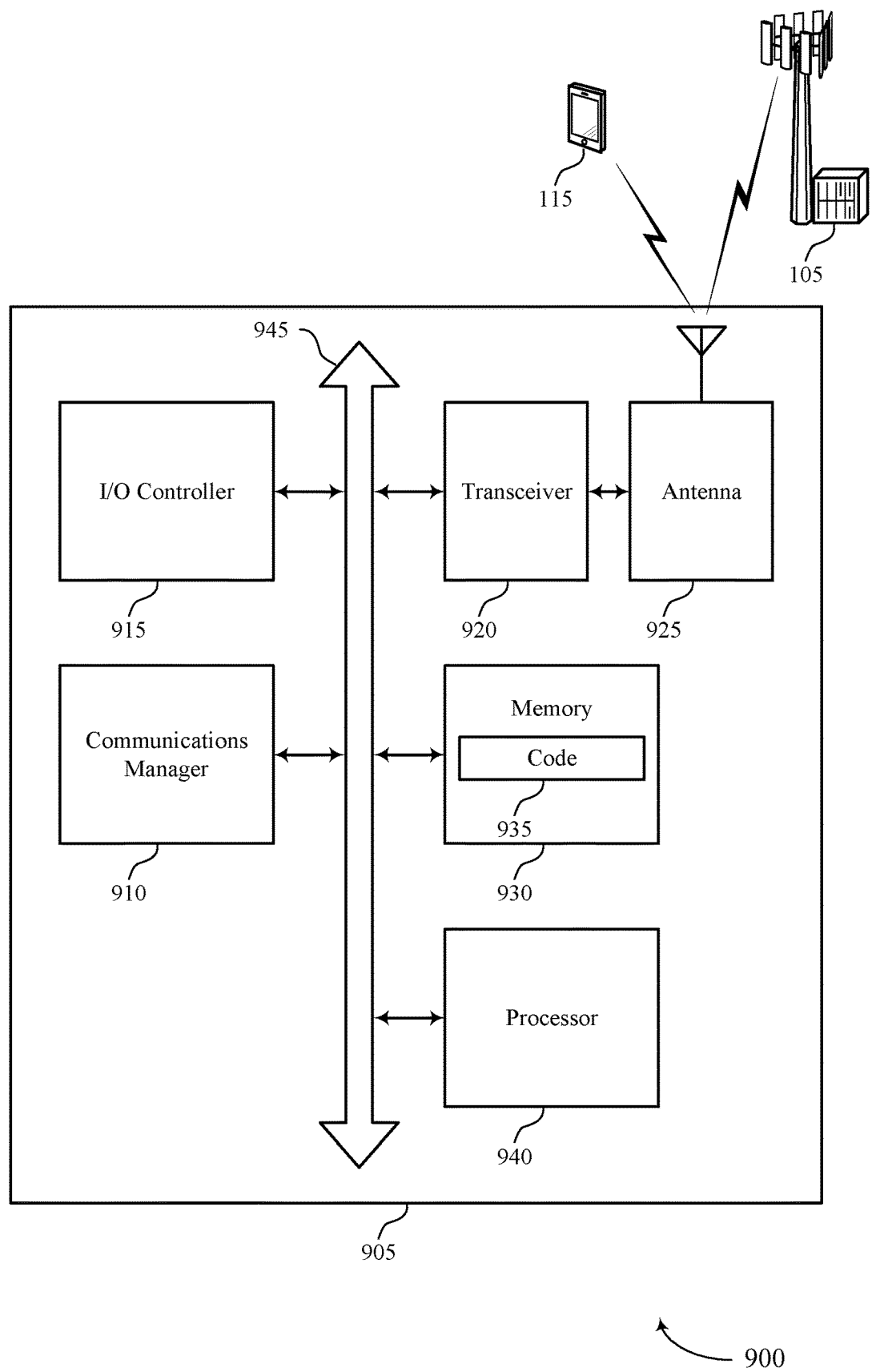
FIG. 9 shows a diagram of a system including a device that supports sidelink channel state information reporting in accordance with aspects of the present disclosure.

FIG. 9 shows a diagram of a system 900 including a device 905 that supports sidelink channel state information reporting in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, first control information associated with sidelink communications between the first UE and one or more second UEs. The communications manager 910 may receive one or more respective sidelink reference signals from each second UE of the one or more second UEs on one or more sidelink channels based on the first control information. The communications manager 910 may transmit, to the base station, a report associated with the one or more sidelink channels based on performing one or more respective channel measurements for each sidelink channel of the one or more sidelink channels. The communications manager 910 may receive, from the base station, second control information associated with the sidelink communications based on the report. The communications manager 910 may communicate the sidelink communications with the one or more second UEs based on the second control information.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink channel state information reporting).

The processor 940 of the device 905 (e.g., controlling the receiver 610, the transmitter 620, or the transceiver 920) may reduce power consumption and increase sidelink transmission reliability according to the techniques described herein. In some aspects, the processor 940 of the device 905 may measure channel conditions based on the sidelink reference signals. For example, the processor 940 of the device 905 may turn on one or more processing units for measuring channel conditions, increase a processing clock, or a similar mechanism within the device 905. As such, when subsequent sidelink communications are scheduled, the processor 940 may more accurately measure channel conditions. Improvements in channel measurement may result in improvements in power saving and sidelink transmission reliability, which may further increase power efficiency at the device 905 (e.g., by eliminating unnecessary repeated sidelink communications, etc.).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
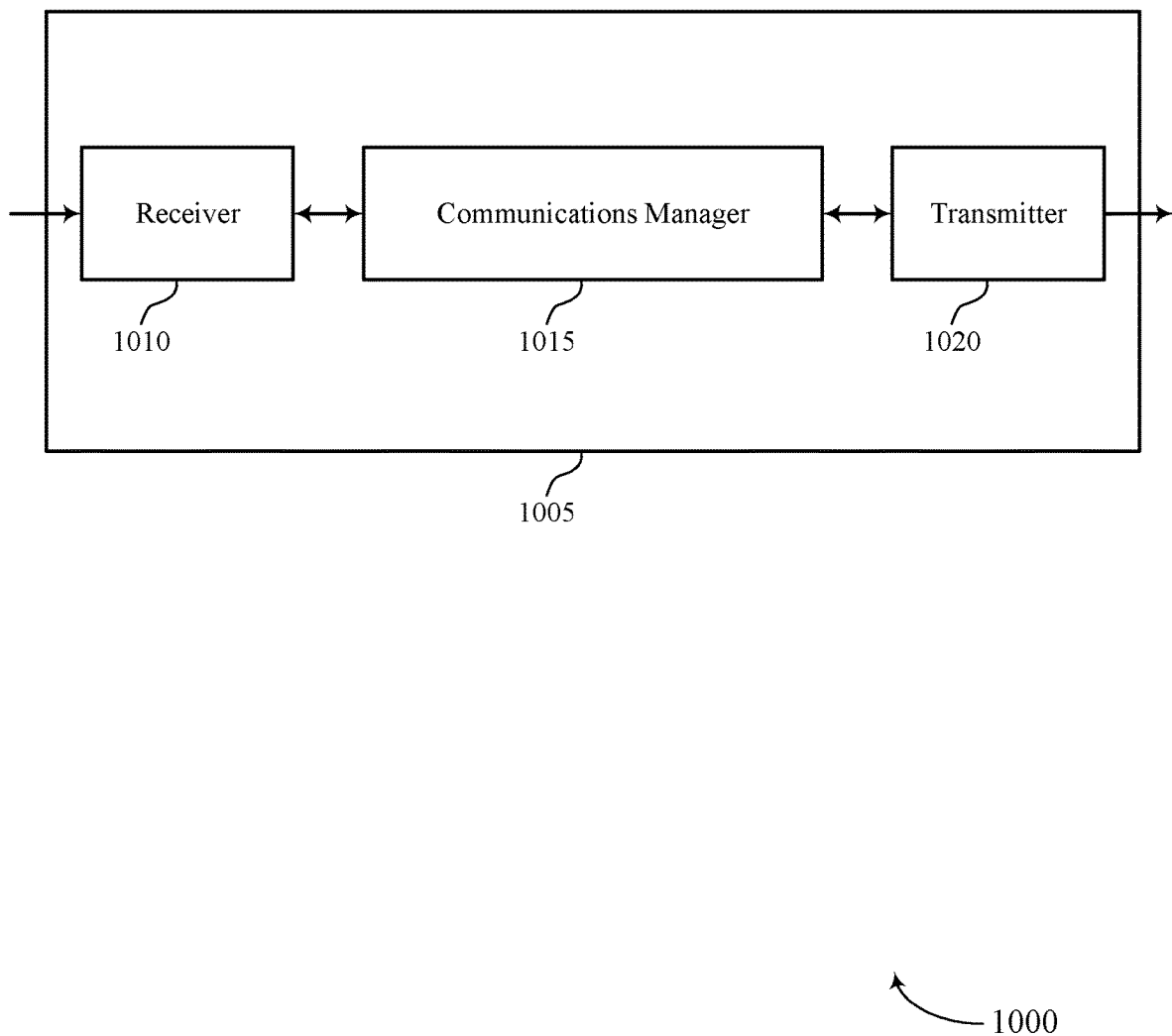
FIGS. 10 and 11 show block diagrams of devices that support sidelink channel state information reporting in accordance with aspects of the present disclosure.

FIG. 10 shows a block diagram 1000 of a device 1005 that supports sidelink channel state information reporting in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to sidelink channel state information reporting, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a first UE, first control information corresponding to sidelink communications between the first UE and one or more second UEs. In some examples, the communications manager 1015 may receive, from the first UE, a report associated with one or more sidelink channels for the sidelink communications based on transmitting the first control information. The communications manager 1015 also may determine second control information corresponding to the sidelink communications based on receiving the report. The communications manager 1015 also may transmit the second control information to the first UE based on the determining.

The communications manager 1015 as described herein may be implemented to realize one or more potential advantages. One implementation may allow the device 1005 to save power by communicating with UEs 115 (as shown in FIG. 1) more efficiently. For example, the device 1005 may improve reliability in sidelink communications between UEs 115, as the device 1005 may be able to determine, based on receiving the report, appropriate scheduling for the sidelink communications between the UEs 115. Using the techniques described herein, the device 1005 may reduce waste and duplication of sidelink communications between the UEs 115. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
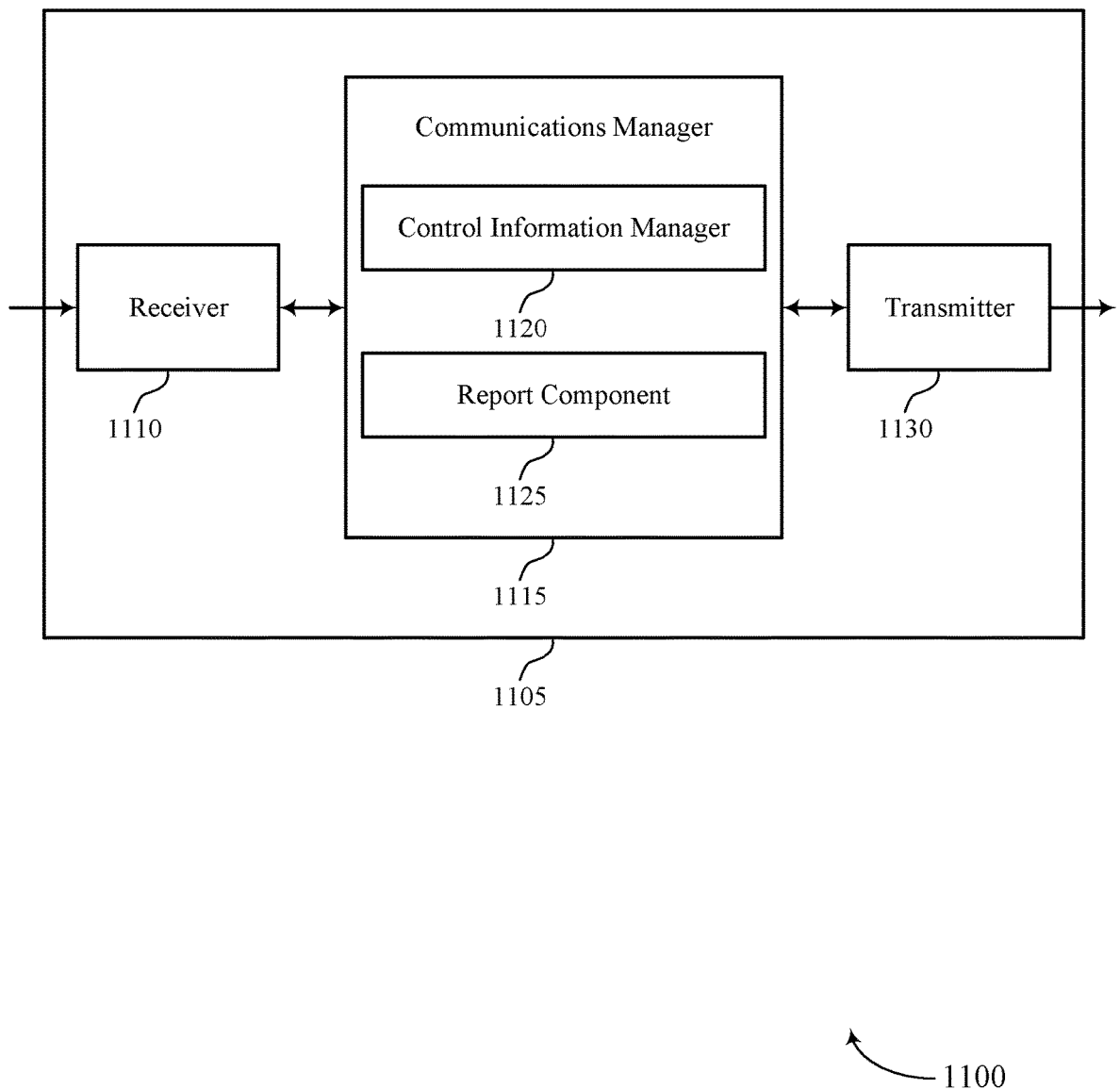

FIG. 11 shows a block diagram 1100 of a device 1105 that supports sidelink channel state information reporting in accordance with aspects of the present disclosure. The device 1105 may be an example of aspects of a device 1005, or a base station 105 as described herein. The device 1105 may include a receiver 1110, a communications manager 1115, and a transmitter 1130. The device 1105 may also include a processor. Each of these components may be in communication with one another (e.g., via one or more buses).

The receiver 1110 may receive information such as packets, user data, or control information associated with various information channels (e.g., control channels, data channels, and information related to sidelink channel state information reporting, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a control information manager 1120 and a report component 1125. The communications manager 1115 may be an example of aspects of the communications manager 1310 described herein.

The control information manager 1120 may transmit, to a first UE, first control information corresponding to sidelink communications between the first UE and one or more second UEs. The control information manager 1120 may determine second control information corresponding to the sidelink communications based on receiving the report. The report component 1125 may receive, from the first UE, a report associated with one or more sidelink channels for the sidelink communications based on transmitting the first control information. The control information manager 1120 may transmit the second control information to the first UE based on the determining.

The transmitter 1130 may transmit signals generated by other components of the device 1105. In some examples, the transmitter 1130 may be collocated with a receiver 1110 in a transceiver module. For example, the transmitter 1130 may be an example of aspects of the transceiver 1320 described with reference to FIG. 13. The transmitter 1130 may utilize a single antenna or a set of antennas.

Figure 12:
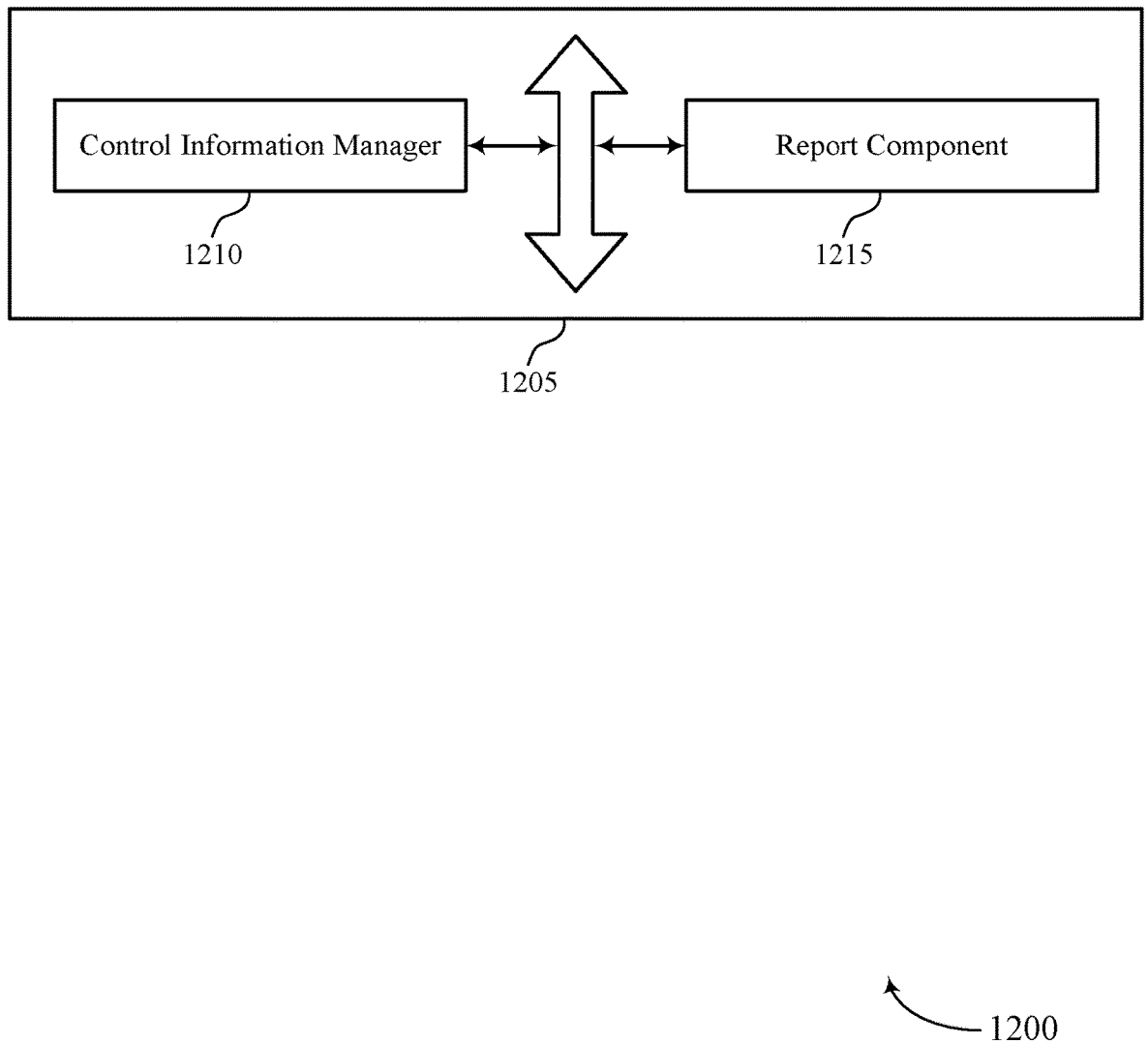
FIG. 12 shows a block diagram of a communications manager that supports sidelink channel state information reporting in accordance with aspects of the present disclosure.

FIG. 12 shows a block diagram 1200 of a communications manager 1205 that supports sidelink channel state information reporting in accordance with aspects of the present disclosure. The communications manager 1205 may be an example of aspects of a communications manager 1015, a communications manager 1115, or a communications manager 1310 described herein. The communications manager 1205 may include a control information manager 1210 and a report component 1215. Each of these modules may communicate, directly or indirectly, with one another (e.g., via one or more buses).

The control information manager 1210 may transmit, to a first UE, first control information corresponding to sidelink communications between the first UE and one or more second UEs. In some examples, the control information manager 1210 may transmit the first control information to the one or more second UEs, where receiving the report is further based on transmitting the first control information to the one or more second UEs. In some examples, the control information manager 1210 may determine an uplink shared channel transmission resource allocation for the first UE, where the first control information includes the uplink shared channel transmission resource allocation. In some cases, the first control information is transmitted in a group common downlink control information message.

In some examples, the control information manager 1210 may determine second control information corresponding to the sidelink communications based on receiving the report. In some examples, the control information manager 1210 may transmit the second control information to the first UE based on the determining. In some cases, the second control information schedules the sidelink communications with the one or more second UEs. In some cases, the second control information includes a modulation and coding scheme, a power control command, one or more signal precoders for the sidelink communications based on the report, or any combination thereof. In some cases, the second control information is transmitted in a downlink control information message, a radio resource control message, or both.

The report component 1215 may receive, from the first UE, a report associated with one or more sidelink channels for the sidelink communications based on transmitting the first control information. In some examples, the report component 1215 may receive the uplink shared channel transmission based on transmitting the first control information, where the uplink shared channel transmission includes the report. In some cases, the report includes one or more respective sidelink channel reports corresponding to each sidelink channel of the one or more sidelink channels. In some cases, the report includes a CSI report. In some cases, the report includes a respective reference signal resource index corresponding to each sidelink reference signal of one or more sidelink reference signals corresponding to the one or more sidelink channels.

Figure 13:
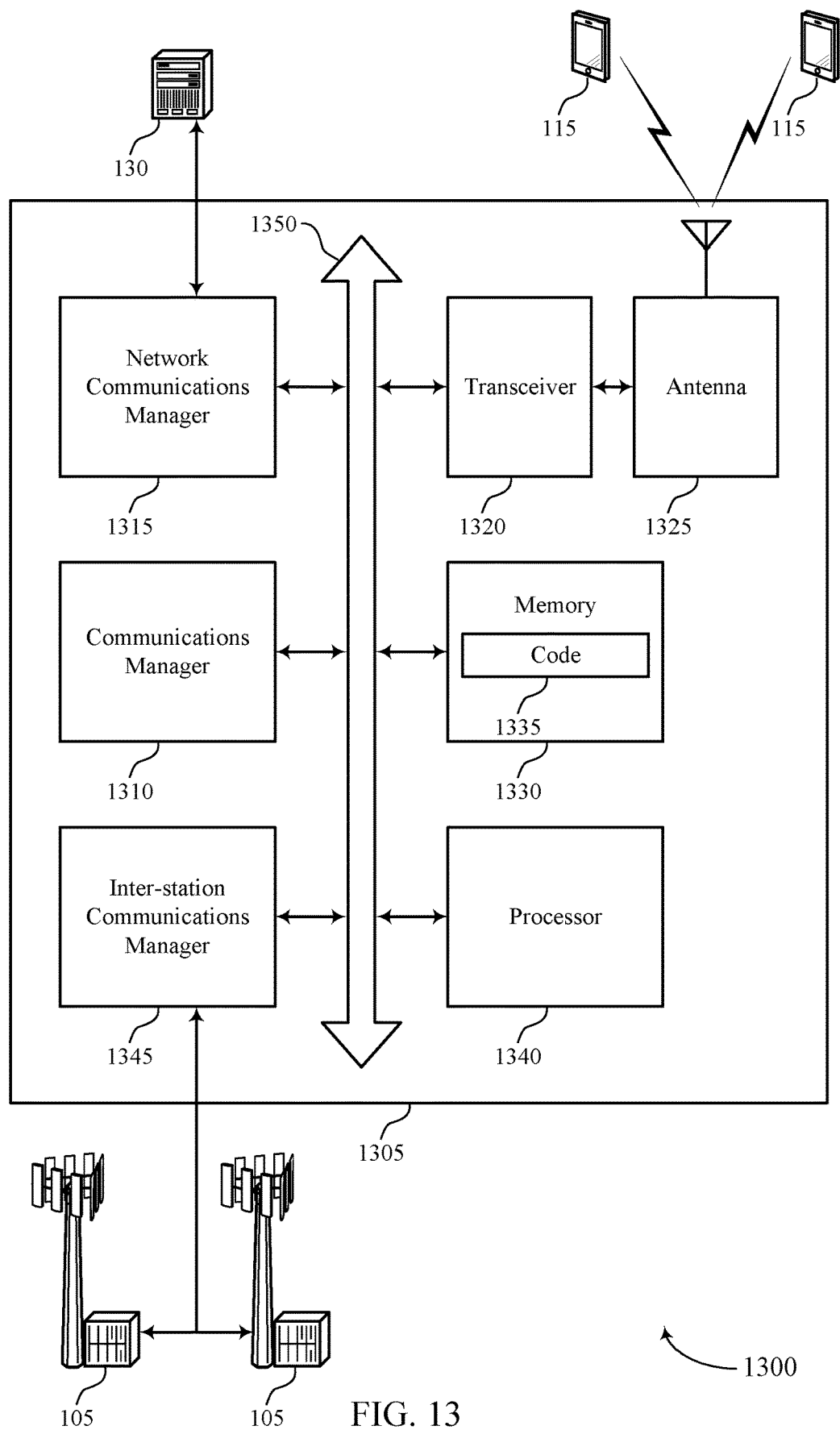
FIG. 13 shows a diagram of a system including a device that supports sidelink channel state information reporting in accordance with aspects of the present disclosure.

FIG. 13 shows a diagram of a system 1300 including a device 1305 that supports sidelink channel state information reporting in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a first UE, first control information corresponding to sidelink communications between the first UE and one or more second UEs. The communications manager 1310 also may receive, from the first UE, a report associated with one or more sidelink channels for the sidelink communications based on transmitting the first control information. In some examples, the communications manager 1310 may determine second control information corresponding to the sidelink communications based on receiving the report. The communications manager 1310 also may transmit the second control information to the first UE based on the determining.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting sidelink channel state information reporting).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
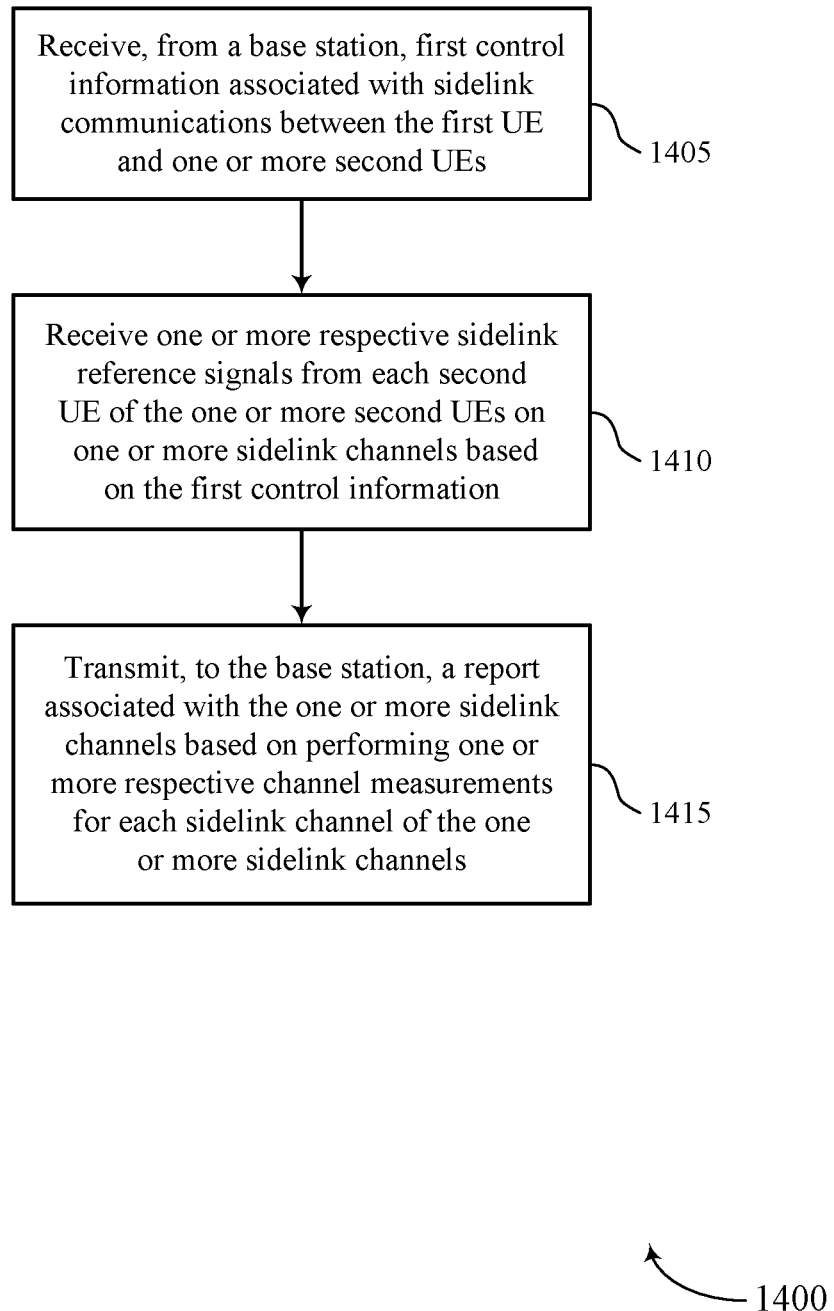
FIGS. 14 through 17 show flowcharts illustrating methods that support sidelink channel state information reporting in accordance with aspects of the present disclosure.

FIG. 14 shows a flowchart illustrating a method 1400 that supports sidelink channel state information reporting in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1405, the UE may receive, from a base station, first control information associated with sidelink communications between the first UE and one or more second UEs. The operations of 1405 may be performed according to the methods described herein. In some examples, aspects of the operations of 1405 may be performed by a control information component as described with reference to FIGS. 6 through 9.

At 1410, the UE may receive one or more respective sidelink reference signals from each second UE of the one or more second UEs on one or more sidelink channels based on the first control information. The operations of 1410 may be performed according to the methods described herein. In some examples, aspects of the operations of 1410 may be performed by a sidelink reference signal manager as described with reference to FIGS. 6 through 9.

At 1415, the UE may transmit, to the base station, a report associated with the one or more sidelink channels based on performing one or more respective channel measurements for each sidelink channel of the one or more sidelink channels. The operations of 1415 may be performed according to the methods described herein. In some examples, aspects of the operations of 1415 may be performed by a sidelink report manager as described with reference to FIGS. 6 through 9.

Figure 15:
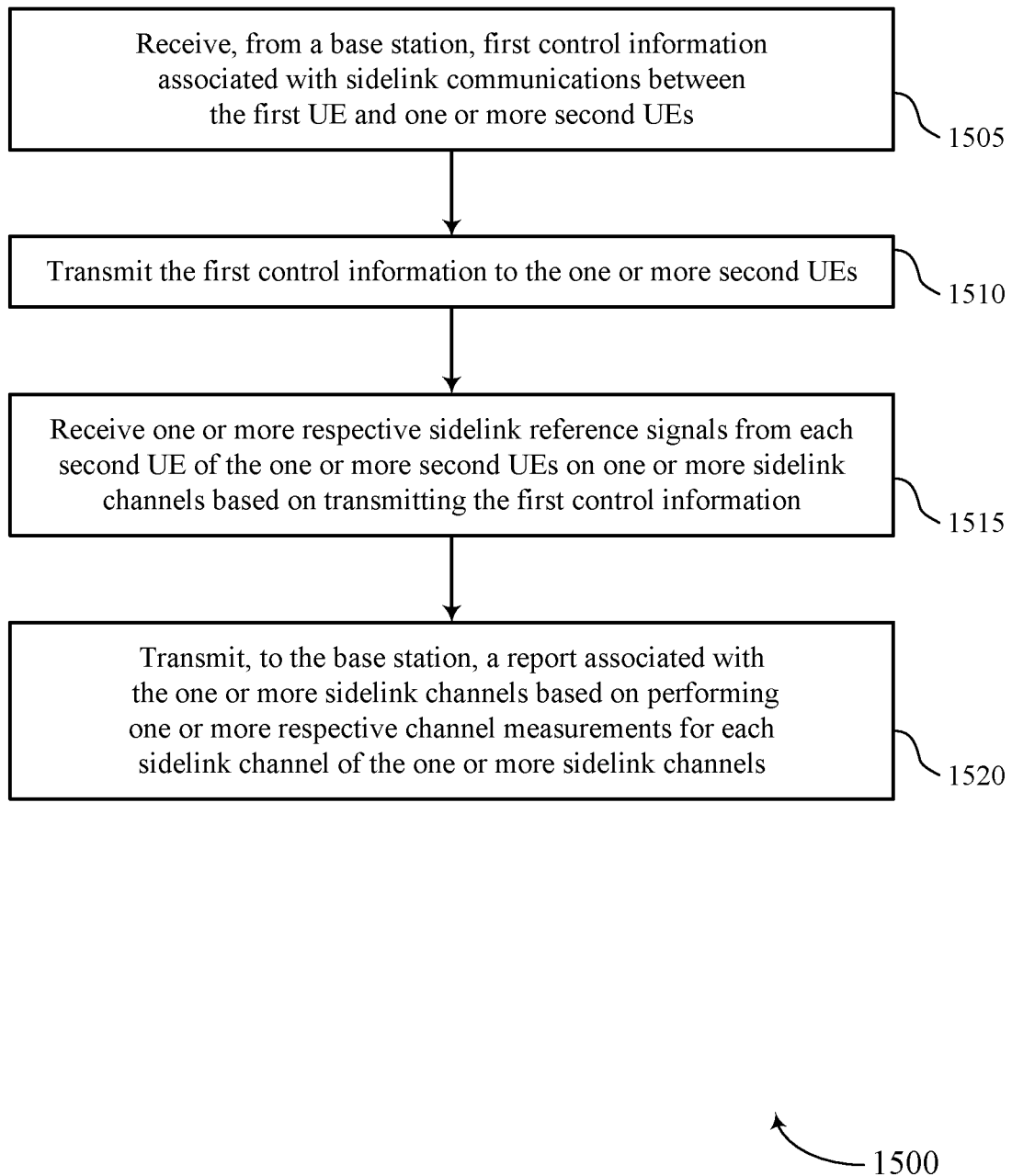

FIG. 15 shows a flowchart illustrating a method 1500 that supports sidelink channel state information reporting in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, first control information associated with sidelink communications between the first UE and one or more second UEs. The operations of 1505 may be performed according to the methods described herein. In some examples, aspects of the operations of 1505 may be performed by a control information component as described with reference to FIGS. 6 through 9.

At 1510, the UE may transmit the first control information to the one or more second UEs. The operations of 1510 may be performed according to the methods described herein. In some examples, aspects of the operations of 1510 may be performed by a control information component as described with reference to FIGS. 6 through 9.

At 1515, the UE may receive one or more respective sidelink reference signals from each second UE of the one or more second UEs on one or more sidelink channels based on transmitting the first control information. The operations of 1515 may be performed according to the methods described herein. In some examples, aspects of the operations of 1515 may be performed by a sidelink reference signal manager as described with reference to FIGS. 6 through 9.

At 1520, the UE may transmit, to the base station, a report associated with the one or more sidelink channels based on performing one or more respective channel measurements for each sidelink channel of the one or more sidelink channels. The operations of 1520 may be performed according to the methods described herein. In some examples, aspects of the operations of 1520 may be performed by a sidelink report manager as described with reference to FIGS. 6 through 9.

Figure 16:
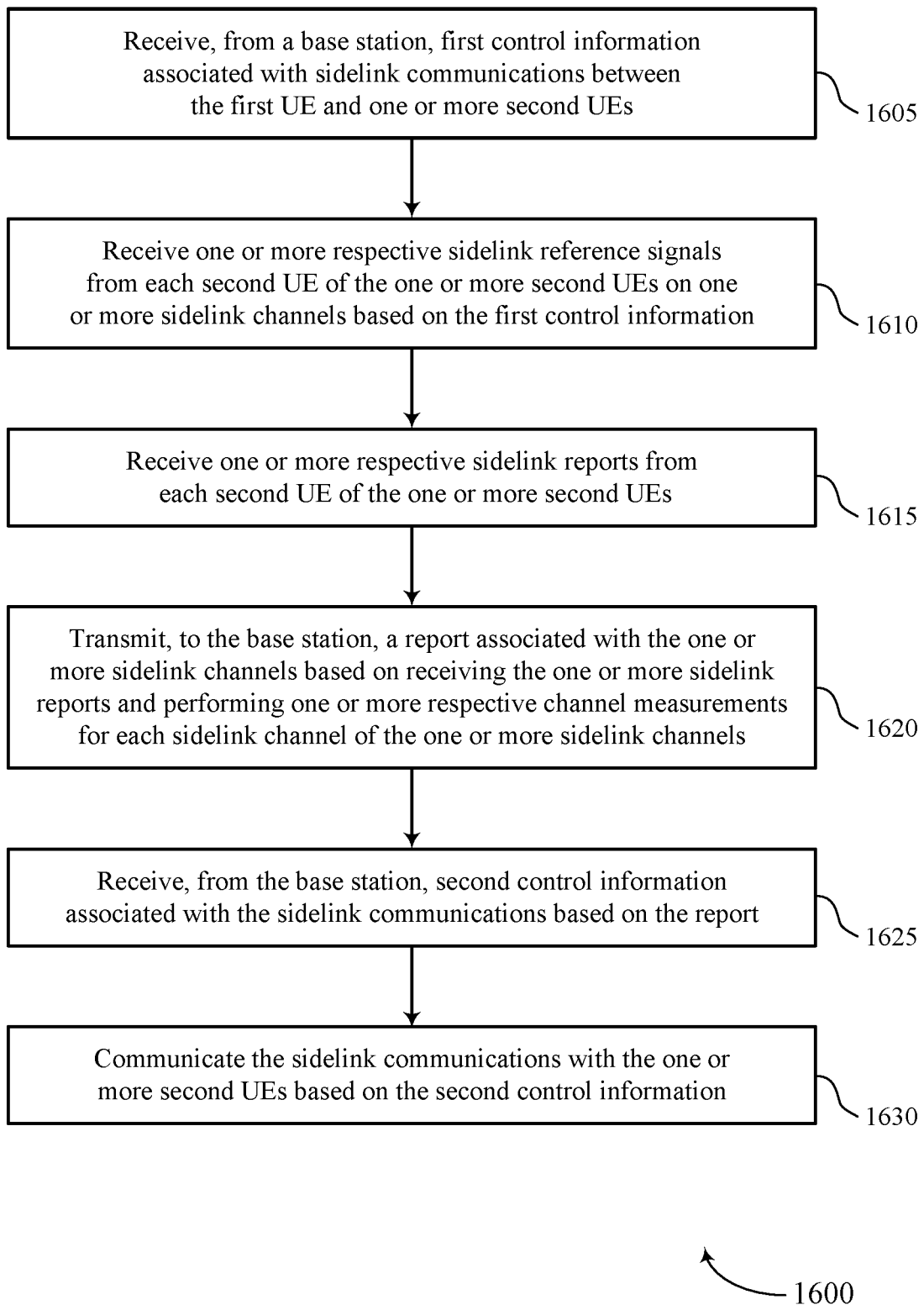

FIG. 16 shows a flowchart illustrating a method 1600 that supports sidelink channel state information reporting in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1605, the UE may receive, from a base station, first control information associated with sidelink communications between the first UE and one or more second UEs. The operations of 1605 may be performed according to the methods described herein. In some examples, aspects of the operations of 1605 may be performed by a control information component as described with reference to FIGS. 6 through 9.

At 1610, the UE may receive one or more respective sidelink reference signals from each second UE of the one or more second UEs on one or more sidelink channels based on the first control information. The operations of 1610 may be performed according to the methods described herein. In some examples, aspects of the operations of 1610 may be performed by a sidelink reference signal manager as described with reference to FIGS. 6 through 9.

At 1615, the UE may receive one or more respective sidelink reports from each second UE of the one or more second UEs. The operations of 1615 may be performed according to the methods described herein. In some examples, aspects of the operations of 1615 may be performed by a sidelink report manager as described with reference to FIGS. 6 through 9.

At 1620, the UE may transmit, to the base station, a report associated with the one or more sidelink channels based on receiving the one or more sidelink reports and performing one or more respective channel measurements for each sidelink channel of the one or more sidelink channels. The operations of 1620 may be performed according to the methods described herein. In some examples, aspects of the operations of 1620 may be performed by a sidelink report manager as described with reference to FIGS. 6 through 9.

At 1625, the UE may receive, from the base station, second control information associated with the sidelink communications based on the report. The operations of 1625 may be performed according to the methods described herein. In some examples, aspects of the operations of 1625 may be performed by a control information component as described with reference to FIGS. 6 through 9.

At 1630, the UE may communicate the sidelink communications with the one or more second UEs based on the second control information. The operations of 1630 may be performed according to the methods described herein. In some examples, aspects of the operations of 1630 may be performed by a sidelink communication manager as described with reference to FIGS. 6 through 9.

Figure 17:
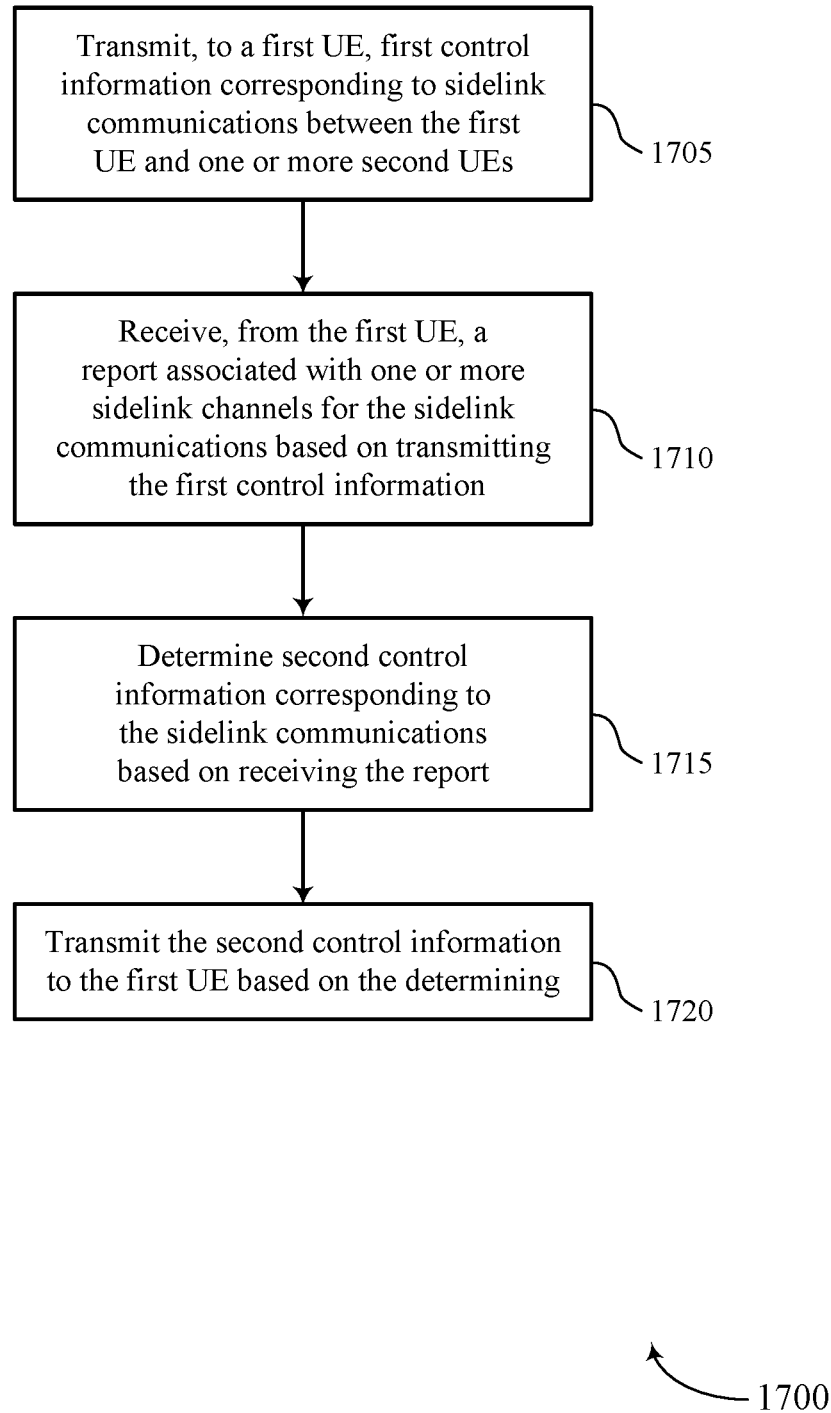

FIG. 17 shows a flowchart illustrating a method 1700 that supports sidelink channel state information reporting in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

At 1705, the base station may transmit, to a first UE, first control information corresponding to sidelink communications between the first UE and one or more second UEs. The operations of 1705 may be performed according to the methods described herein. In some examples, aspects of the operations of 1705 may be performed by a control information manager as described with reference to FIGS. 10 through 13.

At 1710, the base station may receive, from the first UE, a report associated with one or more sidelink channels for the sidelink communications based on transmitting the first control information. The operations of 1710 may be performed according to the methods described herein. In some examples, aspects of the operations of 1710 may be performed by a report component as described with reference to FIGS. 10 through 13.

At 1715, the base station may determine second control information corresponding to the sidelink communications based on receiving the report. The operations of 1715 may be performed according to the methods described herein. In some examples, aspects of the operations of 1715 may be performed by a control information manager as described with reference to FIGS. 10 through 13.

At 1720, the base station may transmit the second control information to the first UE based on the determining. The operations of 1720 may be performed according to the methods described herein. In some examples, aspects of the operations of 1720 may be performed by a control information manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a first UE, comprising: receiving, from a base station, first control information associated with sidelink communications between the first UE and one or more second UEs; receiving one or more respective sidelink reference signals from each second UE of the one or more second UEs on one or more sidelink channels based at least in part on the first control information; and transmitting, to the base station, a report associated with the one or more sidelink channels based at least in part on performing one or more respective channel measurements for each sidelink channel of the one or more sidelink channels.

Aspect 2: The method of aspect 1, further comprising: transmitting the first control information to the one or more second UEs, wherein the one or more sidelink reference signals are received based at least in part on transmitting the first control information.

Aspect 3: The method of aspect 2, wherein transmitting the first control information comprises: transmitting the first control information to the one or more second UEs in a sidelink control information message, a data channel transmission, or both.

Aspect 4: The method of any of aspects 1 through 3, further comprising: performing the one or more respective channel measurements for each sidelink channel of the one or more sidelink channels based at least in part on receiving the one or more respective sidelink reference signals from each second UE of the one or more second UEs.

Aspect 5: The method of any of aspects 1 through 4, further comprising: identifying an uplink shared channel transmission resource allocation in the first control information; and transmitting the uplink shared channel transmission based at least in part on receiving the first control information, wherein the uplink shared channel transmission comprises the report.

Aspect 6: The method of aspect 5, further comprising: determining an offset for the uplink shared channel transmission resource allocation; and applying the offset to the uplink shared channel transmission resource allocation, wherein the uplink shared channel transmission is further transmitted based at least in part on applying the offset.

Aspect 7: The method of any of aspects 1 through 6, further comprising: receiving one or more respective sidelink reports from each second UE of the one or more second UEs, wherein transmitting the report to the base station is further based at least in part on receiving the one or more sidelink reports.

Aspect 8: The method of any of aspects 1 through 7, wherein the one or more sidelink reference signals are received in an active sidelink bandwidth or a bandwidth part of the active sidelink bandwidth.

Aspect 9: The method of any of aspects 1 through 8, wherein the report comprises one or more respective sidelink channel reports corresponding to each sidelink channel of the one or more sidelink channels.

Aspect 10: The method of any of aspects 1 through 9, further comprising: receiving, from the base station, second control information associated with the sidelink communications based at least in part on the report; and communicating the sidelink communications with the one or more second UEs based at least in part on the second control information Aspect 11: The method of aspect 10, wherein the second control information schedules the sidelink communications with the one or more second UEs; and the second control information comprises a modulation and coding scheme, a power control command, one or more signal precoders for the sidelink communications based at least in part on the report, or any combination thereof.

Aspect 12: The method of any of aspects 1 through 11, wherein the first control information is received in a downlink control information message for the first UE.

Aspect 13: The method of any of aspects 1 through 12, wherein the first control information is received in a group common downlink control information message.

Aspect 14: The method of any of aspects 1 through 13, wherein each sidelink reference signal of the one or more sidelink reference signals comprises a sidelink CSI reference signal (CSI-RS); and the report comprises a CSI report.

Aspect 15: The method of any of aspects 1 through 14, wherein the report comprises a respective reference signal resource index corresponding to each sidelink reference signal of the one or more sidelink reference signals received on the one or more sidelink channels.

Aspect 16: A method for wireless communications at a base station, comprising: transmitting, to a first UE, first control information corresponding to sidelink communications between the first UE and one or more second UEs; and receiving, from the first UE, a report associated with one or more sidelink channels for the sidelink communications based at least in part on transmitting the first control information.

Aspect 17: The method of aspect 16, further comprising: transmitting the first control information to the one or more second UEs, wherein receiving the report is further based at least in part on transmitting the first control information to the one or more second UEs.

Aspect 18: The method of any of aspects 16 through 17, further comprising: determining an uplink shared channel transmission resource allocation for the first UE, wherein the first control information comprises the uplink shared channel transmission resource allocation; and receiving the uplink shared channel transmission based at least in part on transmitting the first control information, wherein the uplink shared channel transmission comprises the report.

Aspect 19: The method of any of aspects 16 through 18, wherein the report comprises one or more respective sidelink channel reports corresponding to each sidelink channel of the one or more sidelink channels.

Aspect 20: The method of any of aspects 16 through 19, further comprising: determining second control information corresponding to the sidelink communications based at least in part on receiving the report; and transmitting the second control information to the first UE based at least in part on the determining.

Aspect 21: The method of aspect 20, wherein the second control information schedules the sidelink communications with the one or more second UEs; and the second control information comprises a modulation and coding scheme, a power control command, one or more signal precoders for the sidelink communications based at least in part on the report, or any combination thereof.

Aspect 22: The method of any of aspects 16 through 21, wherein the first control information is transmitted in a group common downlink control information message.

Aspect 23: The method of any of aspects 16 through 22, wherein the report comprises a respective reference signal resource index corresponding to each sidelink reference signal of one or more sidelink reference signals corresponding to the one or more sidelink channels.

Aspect 24: An apparatus for wireless communications at a first UE, comprising a processor; memory coupled with the processor; and instructions stored in the memory and executable by the processor to cause the apparatus to perform a method of any of aspects 1 through 15.

Aspect 25: An apparatus for wireless communications at a first UE, comprising at least one means for performing a method of any of aspects 1 through 15.

Aspect 26: A non-transitory computer-readable medium storing code for wireless communications at a first UE, the code comprising instructions executable by a processor to perform a method of any of aspects 1 through 15.

Aspect 27: An apparatus for wireless communications at a base station, comprising a processor; memory coupled with the processor; and instructions stored in the memory and executable by the processor to cause the apparatus to perform a method of any of aspects 16 through 23.

Aspect 28: An apparatus for wireless communications at a base station, comprising at least one means for performing a method of any of aspects 16 through 23.

Aspect 29: A non-transitory computer-readable medium storing code for wireless communications at a base station, the code comprising instructions executable by a processor to perform a method of any of aspects 16 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
receiving, from a base station, first control information associated with sidelink communications between the first UE and one or more second UEs;
receiving one or more respective sidelink reference signals from each second UE of the one or more second UEs on one or more sidelink channels based at least in part on the first control information;
transmitting, to the base station, a report associated with the one or more sidelink channels based at least in part on performing one or more respective channel measurements for each sidelink channel of the one or more sidelink channels;
identifying an uplink shared channel transmission resource allocation in the first control information; and
transmitting the uplink shared channel transmission based at least in part on receiving the first control information, wherein the uplink shared channel transmission comprises the report.

2. The method of claim 1, further comprising:
transmitting the first control information to the one or more second UEs, wherein the one or more sidelink reference signals are received based at least in part on transmitting the first control information.

3. The method of claim 2, wherein transmitting the first control information comprises:
transmitting the first control information to the one or more second UEs in a sidelink control information message, a data channel transmission, or both.

4. The method of claim 1, further comprising:
performing the one or more respective channel measurements for each sidelink channel of the one or more sidelink channels based at least in part on receiving the one or more respective sidelink reference signals from each second UE of the one or more second UEs.

5. The method of claim 1, further comprising:
determining an offset for the uplink shared channel transmission resource allocation; and
applying the offset to the uplink shared channel transmission resource allocation, wherein the uplink shared channel transmission is further transmitted based at least in part on applying the offset.

6. A method for wireless communications at a first user equipment (UE), comprising:
receiving, from a base station, first control information associated with sidelink communications between the first UE and one or more second UEs;
receiving one or more respective sidelink reference signals from each second UE of the one or more second UEs on one or more sidelink channels based at least in part on the first control information;
transmitting, to the base station, a report associated with the one or more sidelink channels based at least in part on performing one or more respective channel measurements for each sidelink channel of the one or more sidelink channels; and
receiving one or more respective sidelink reports from each second UE of the one or more second UEs, wherein transmitting the report to the base station is further based at least in part on receiving the one or more sidelink reports.

7. The method of claim 1, wherein the one or more sidelink reference signals are received in an active sidelink bandwidth or a bandwidth part of the active sidelink bandwidth.

8. The method of claim 1, wherein the report comprises one or more respective sidelink channel reports corresponding to each sidelink channel of the one or more sidelink channels.

9. The method of claim 1, further comprising:
receiving, from the base station, second control information associated with the sidelink communications based at least in part on the report; and
communicating the sidelink communications with the one or more second UEs based at least in part on the second control information.

10. The method of claim 9, wherein:
the second control information schedules the sidelink communications with the one or more second UEs; and
the second control information comprises a modulation and coding scheme, a power control command, one or more signal precoders for the sidelink communications based at least in part on the report, or any combination thereof.

11. The method of claim 1, wherein the first control information is received in a downlink control information message for the first UE.

12. The method of claim 1, wherein the first control information is received in a group common downlink control information message.

13. The method of claim 1, wherein:
each sidelink reference signal of the one or more sidelink reference signals comprises a sidelink channel state information (CSI) reference signal (CSI-RS); and
the report comprises a CSI report.

14. The method of claim 1, wherein the report comprises a respective reference signal resource index corresponding to each sidelink reference signal of the one or more sidelink reference signals received on the one or more sidelink channels.

15. A method for wireless communications at a base station, comprising:
transmitting, to a first user equipment (UE), first control information corresponding to sidelink communications between the first UE and one or more second UEs;
receiving, from the first UE, a report associated with one or more sidelink channels for the sidelink communications based at least in part on transmitting the first control information;
determining an uplink shared channel transmission resource allocation for the first UE, wherein the first control information comprises the uplink shared channel transmission resource allocation; and
receiving the uplink shared channel transmission based at least in part on transmitting the first control information, wherein the uplink shared channel transmission comprises the report.

16. The method of claim 15, further comprising:
transmitting the first control information to the one or more second UEs, wherein receiving the report is further based at least in part on transmitting the first control information to the one or more second UEs.

17. The method of claim 15, wherein the report comprises one or more respective sidelink channel reports corresponding to each sidelink channel of the one or more sidelink channels.

18. The method of claim 15, further comprising:
determining second control information corresponding to the sidelink communications based at least in part on receiving the report; and
transmitting the second control information to the first UE based at least in part on the determining.

19. The method of claim 18, wherein:
the second control information schedules the sidelink communications with the one or more second UEs; and
the second control information comprises a modulation and coding scheme, a power control command, one or more signal precoders for the sidelink communications based at least in part on the report, or any combination thereof.

20. The method of claim 15, wherein the first control information is transmitted in a group common downlink control information message.

21. The method of claim 15, wherein the report comprises a respective reference signal resource index corresponding to each sidelink reference signal of one or more sidelink reference signals corresponding to the one or more sidelink channels.

22. An apparatus for wireless communications at a first user equipment (UE), comprising:
- a processor,
- memory coupled with the processor; and
- instructions stored in the memory and executable by the processor to cause the apparatus to:
  - receive, from a base station, first control information associated with sidelink communications between the first UE and one or more second UEs;
  - receive one or more respective sidelink reference signals from each second UE of the one or more second UEs on one or more sidelink channels based at least in part on the first control information;
  - transmit, to the base station, a report associated with the one or more sidelink channels based at least in part on performing one or more respective channel measurements for each sidelink channel of the one or more sidelink channels;
  - identify an uplink shared channel transmission resource allocation in the first control information; and
  - transmit the uplink shared channel transmission based at least in part on receiving the first control information, wherein the uplink shared channel transmission comprises the report.

23. The apparatus of claim 22, wherein the instructions are further executable by the processor to cause the apparatus to:
- transmit the first control information to the one or more second UEs, wherein the one or more sidelink reference signals are received based at least in part on transmitting the first control information.

24. The apparatus of claim 23, wherein the instructions are further executable by the processor to cause the apparatus to:
- transmit the first control information to the one or more second UEs in a sidelink control information message, a data channel transmission, or both.

25. The apparatus of claim 22, wherein the instructions are further executable by the processor to cause the apparatus to:
- perform the one or more respective channel measurements for each sidelink channel of the one or more sidelink channels based at least in part on receiving the one or more respective sidelink reference signals from each second UE of the one or more second UEs.

26. An apparatus for wireless communications at a base station, comprising:
- a processor,
- memory coupled with the processor; and
- instructions stored in the memory and executable by the processor to cause the apparatus to:
  - transmit, to a first user equipment (UE), first control information corresponding to sidelink communications between the first UE and one or more second UEs;
  - receive, from the first UE, a report associated with one or more sidelink channels for the sidelink communications based at least in part on transmitting the first control information;
  - determine an uplink shared channel transmission resource allocation for the first UE, wherein the first control information comprises the uplink shared channel transmission resource allocation; and
  - receive the uplink shared channel transmission based at least in part on transmitting the first control information, wherein the uplink shared channel transmission comprises the report.

27. The apparatus of claim 26, wherein the instructions are further executable by the processor to cause the apparatus to:
- transmit the first control information to the one or more second UEs, wherein receiving the report is further based at least in part on transmitting the first control information to the one or more second UEs.

* * * * *